US008631087B2

(12) United States Patent
Ise et al.

(10) Patent No.: US 8,631,087 B2
(45) Date of Patent: Jan. 14, 2014

(54) INFORMATION PROCESSING SERVER, REMOTE CONTROL SYSTEM, AND REMOTE CONTROL METHOD USING A TUNNEL TO DETERMINE A SERVICE ON ANOTHER NETWORK AND EXECUTING THE SERVICE WITHOUT USING THE TUNNEL

(75) Inventors: Kotaro Ise, Saitama (JP); Shinya Murai, Yokohama (JP); Takuya Kawamura, Kawasaki (JP); Masataka Goto, Yokohama (JP); Keiichi Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1319 days.

(21) Appl. No.: 10/584,753

(22) PCT Filed: Mar. 28, 2006

(86) PCT No.: PCT/JP2006/307009
§ 371 (c)(1),
(2), (4) Date: Jan. 3, 2007

(87) PCT Pub. No.: WO2006/132024
PCT Pub. Date: Dec. 14, 2006

(65) Prior Publication Data
US 2007/0288550 A1 Dec. 13, 2007

(30) Foreign Application Priority Data

Jun. 7, 2005 (JP) .................................. 2005-167231

(51) Int. Cl.
*G06F 15/16* (2006.01)
*G06F 15/173* (2006.01)
*H04L 12/28* (2006.01)

(52) U.S. Cl.
USPC ............ 709/217; 370/399; 709/227; 709/238

(58) Field of Classification Search
USPC .................... 709/224, 217, 227, 238; 370/399
See application file for complete search history.

(56) References Cited

U.S. PATENT DOCUMENTS 6,115,137 A * 9/2000 Ozawa et al. .................. 358/1.6
6,377,982 B1 * 4/2002 Rai et al. ....................... 709/217
(Continued)

FOREIGN PATENT DOCUMENTS

| CN | 1348130 A | 5/2002 |
| EP | 1 022 876 | 7/2000 |
| JP | 2003-288536 | 10/2003 |

OTHER PUBLICATIONS

U.S. Appl. No. 11/469,722, filed Sep. 1, 2006, Ise.

*Primary Examiner* — Tonia L Dollinger
*Assistant Examiner* — Daniel C Murray
(74) *Attorney, Agent, or Firm* — Oblon, Spivak, McClelland, Maier & Neustadt, L.L.P.

(57) ABSTRACT

There is provided with a remote control method using a terminal device connected to a first network and an information processing server connected to a second network, including: setting a tunnel between the terminal device and the information processing server; transmitting a broadcast or multicast packet output from service providing servers on the first network to the information processing server via the tunnel to cause the server to find the service providing servers and services provided by the service providing servers; notifying the terminal device of the services found, from the information processing server via the tunnel or the second network; and if execution request of the service is received by the information processing server from the terminal device via the tunnel or the second network, conducting data communication concerning the service between a service providing server providing the service and the information processing server, via the second network.

19 Claims, 16 Drawing Sheets

(56) References Cited

U.S. PATENT DOCUMENTS

| | | | |
|---|---|---|---|
| 6,393,482 B1* | 5/2002 | Rai et al. | 709/225 |
| 6,400,722 B1* | 6/2002 | Chuah et al. | 370/401 |
| 6,512,754 B2* | 1/2003 | Feder et al. | 370/338 |
| 6,532,368 B1* | 3/2003 | Hild et al. | 455/515 |
| 6,587,467 B1* | 7/2003 | Morgenstern et al. | 370/399 |
| 6,765,881 B1* | 7/2004 | Rajakarunanayake | 370/256 |
| 6,961,560 B2* | 11/2005 | Hermann et al. | 455/414.1 |
| 6,973,057 B1* | 12/2005 | Forslow | 370/328 |
| 7,065,579 B2* | 6/2006 | Traversat et al. | 709/230 |
| 7,085,807 B2* | 8/2006 | Simpson et al. | 709/203 |
| 7,117,526 B1* | 10/2006 | Short | 726/5 |
| 7,185,107 B1* | 2/2007 | Cassar | 709/239 |
| 7,206,841 B2* | 4/2007 | Traversat et al. | 709/225 |
| 7,237,260 B2* | 6/2007 | Yu et al. | 726/11 |
| 7,263,345 B2* | 8/2007 | Kotola et al. | 455/403 |
| 7,412,518 B1* | 8/2008 | Duigou et al. | 709/227 |
| 7,426,393 B2* | 9/2008 | Paila | 455/450 |
| 7,471,678 B2* | 12/2008 | Lee et al. | 370/390 |
| 7,478,167 B2* | 1/2009 | Ould-Brahim et al. | 709/238 |
| 7,492,777 B2* | 2/2009 | Ekberg et al. | 370/401 |
| 7,525,947 B2* | 4/2009 | Lee et al. | 370/349 |
| 7,532,630 B2* | 5/2009 | Ould-Brahim | 370/401 |
| 7,533,271 B2* | 5/2009 | Laksono | 713/184 |
| 7,552,234 B2* | 6/2009 | Thubert et al. | 709/238 |
| 7,561,586 B2* | 7/2009 | Wang et al. | 370/401 |
| 7,564,871 B2* | 7/2009 | Liu | 370/468 |
| 7,574,495 B1* | 8/2009 | Rajagopalan | 709/223 |
| 7,574,523 B2* | 8/2009 | Traversat et al. | 709/238 |
| 7,602,702 B1* | 10/2009 | Aggarwal | 370/217 |
| 7,626,984 B2* | 12/2009 | Napierala | 370/389 |
| 7,668,178 B2* | 2/2010 | Martini et al. | 370/395.53 |
| 7,733,876 B2* | 6/2010 | Davie et al. | 370/395.53 |
| 7,797,382 B2* | 9/2010 | Bou-Diab | 709/204 |
| 7,860,978 B2* | 12/2010 | Oba et al. | 709/227 |
| 7,969,978 B2* | 6/2011 | Napierala | 370/389 |
| 7,986,425 B2* | 7/2011 | Nakaota | 358/1.15 |
| 7,995,571 B2* | 8/2011 | Park | 370/389 |
| 8,115,800 B2* | 2/2012 | Murai et al. | 348/14.13 |
| 8,134,923 B2* | 3/2012 | Daures | 370/231 |
| 8,359,397 B2* | 1/2013 | Traversat et al. | 709/230 |
| 2001/0029531 A1* | 10/2001 | Ohta | 709/223 |
| 2002/0042884 A1* | 4/2002 | Wu et al. | 713/201 |
| 2002/0089958 A1* | 7/2002 | Feder et al. | 370/338 |
| 2002/0110087 A1* | 8/2002 | Zelig et al. | 370/236 |
| 2003/0018751 A1* | 1/2003 | Lee et al. | 709/219 |
| 2004/0006708 A1* | 1/2004 | Mukherjee et al. | 713/201 |
| 2004/0030743 A1* | 2/2004 | Hugly et al. | 709/203 |
| 2004/0133679 A1* | 7/2004 | Kennis et al. | 709/225 |
| 2004/0202183 A1* | 10/2004 | Thubert et al. | 370/395.31 |
| 2004/0218535 A1* | 11/2004 | Liong et al. | 370/238 |
| 2004/0218603 A1* | 11/2004 | Lee et al. | 370/390 |
| 2004/0223465 A1* | 11/2004 | Lee et al. | 370/313 |
| 2005/0094575 A1* | 5/2005 | Park | 370/254 |
| 2005/0165953 A1* | 7/2005 | Oba et al. | 709/238 |
| 2005/0175020 A1* | 8/2005 | Park et al. | 370/400 |
| 2006/0133405 A1* | 6/2006 | Fee | 370/437 |
| 2006/0203791 A1* | 9/2006 | Carrion-Rodrigo et al. | 370/338 |
| 2007/0041376 A1* | 2/2007 | Lee et al. | 370/389 |
| 2007/0091897 A1* | 4/2007 | Lee et al. | 370/395.5 |
| 2007/0112975 A1* | 5/2007 | Cassar | 709/239 |
| 2007/0204339 A1* | 8/2007 | Bou-Diab | 726/15 |
| 2008/0037468 A1* | 2/2008 | Zisimopoulos et al. | 370/331 |
| 2011/0182205 A1* | 7/2011 | Gerdes et al. | 370/254 |
| 2011/0255536 A1* | 10/2011 | Liu et al. | 370/390 |
| 2012/0191860 A1* | 7/2012 | Traversat et al. | 709/226 |

* cited by examiner

| IP HEADER | UDP HEADER | MESSAGE CLASSIFICATION | TERMINAL DEVICE ADDRESS | USER IDENTIFIER | COMMUNICATION PARAMETERS |
|---|---|---|---|---|---|

FIG. 4

| THE NUMBER OF ENTRIES | PROTOCOL IDENTIFIER | CODING RATE | SCREEN SIZE |
|---|---|---|---|

FIG. 5

| IP HEADER | UDP HEADER | MESSAGE CLASSIFICATION | MAIN DEVICE ADDRESS | AUTHENTICATION ALGORITHM IDENTIFIER | CHALLENGE PARAMETERS |
|---|---|---|---|---|---|

FIG. 6

| IP HEADER | UDP HEADER | MESSAGE CLASSIFICATION | TERMINAL DEVICE ADDRESS | AUTHENTICATION ALGORITHM IDENTIFIER | USER IDENTIFIER | CHALLENGE PARAMETERS | AUTHENTICATION RESPONSE VALUE |

FIG. 7

| IP HEADER | UDP HEADER | MESSAGE CLASSIFICATION | USER IDENTIFIER |

FIG. 8

| IP HEADER | UDP HEADER | MESSAGE CLASSIFICATION | MAIN DEVICE ADDRESS | MAIN DEVICE SESSION PORT NUMBER | COMMUNICATION PARAMETERS |

FIG. 9

| IP HEADER | UDP HEADER | MESSAGE CLASSIFICATION | TERMINAL DEVICE ADDRESS | TERMINAL DEVICE SESSION PORT NUMBER | COMMUNICATION PARAMETERS |

FIG. 10

| IP HEADER | UDP HEADER | MESSAGE CLASSIFICATION | MAIN DEVICE IP ADDRESS | MAIN DEVICE ETHER ADDRESS |
|---|---|---|---|---|

FIG. 13

| ETHER HEADER | IP HEADER | UDP HEADER | L2TP HEADER | ETHER HEADER | IP HEADER | DATA |
|---|---|---|---|---|---|---|

FIG. 14

INFORMATION PROCESSING SERVER, REMOTE CONTROL SYSTEM, AND REMOTE CONTROL METHOD USING A TUNNEL TO DETERMINE A SERVICE ON ANOTHER NETWORK AND EXECUTING THE SERVICE WITHOUT USING THE TUNNEL

CROSS-REFERENCE TO RELATED APPLICATIONS

This application is based upon and claims the benefit of priority from the prior Japanese Patent Applications No. 2005-167231 filed on Jun. 7, 2005, the entire contents of which are incorporated herein by reference.

BACKGROUND OF THE INVENTION

1. Field of the Invention

The present invention relates to a technique for causing a plurality of computers to conduct cooperative operation.

2. Related Art

In recent years, remote control has been made possible. In the remote control, screen information supplied from a remote computer is displayed on a terminal at hand, and the remote computer is controlled using a mouse or a keyboard connected to the terminal at hand. As examples thereof, "X window system" developed by X.org Foundation, a function in Microsoft Corporation called "Remote Desktop," and VNC (Virtual Network Computing) software can be mentioned. In the X window system, a view on the remote computer is drawn on the terminal at hand by transmitting and receiving drawing commands. However, it is also possible to construct a similar system by encoding the screen on the remote computer by using MPEG2-TS and decoding and displaying a result obtained by the encoding, on the terminal at hand.

Even if the distance between two points is long, fast communication has been made possible by advancement of the Internet.

In general, a computer including a fast CPU and a large capacity hard disk is heavy and it is not handy to carry. On the other hand, a lightweight computer suitable for carrying is relatively slow in CPU capability and small in capacity of the hard disk.

Using the remote control scheme on the Internet, however, it is possible to control the remote computer as if it is at hand. While the lightweight terminal at hand is carried, it is possible to access data stored in the large capacity hard disk and conduct processing using the fast CPU.

According to a method described in Japanese Patent Application Laid-Open Publication No. 2003-288536, map data is transferred from a remote map data server to a car navigation terminal device at hand and displayed on the car navigation terminal device. A destination place is input to the car navigation terminal at hand, and this information is sent to the map data server. Map data of the desired place is received by the car navigation terminal. As a result, a map of the desired place can be displayed on the car navigation terminal at hand. It is possible to get along without equipping the car navigation terminal with a large capacity storage device.

In this way, almost all of computer processing and data storage is entrusted to the remote computer, and the terminal at hand of the user conducts only light processing as an IO device which presents a result of processing sent from the remote computer, to the user, or accepts a keyboard or mouse input given by the user. The application area of such architecture is spreading as the network speed becomes faster in recent years. In this architecture, most processing is conducted by the remote computer. This results in an advantage that the terminal at hand can be constructed using hardware having a low processing capability. In an example of this architecture, a system department of an enterprise manages the remote computer and members are treated as users to construct a computer system. In another example of the architecture, an ASP (application service provider) manages the remote computer and provides service of lending computer resources to users. Even if application is sophisticated and a higher calculation processing capability is needed in such a case, it suffices to increase only the processing capability of the remote computer and it is unnecessary to increase the processing capability of the terminal at hand of the user. This results in an advantage that the user can be saved the labor of updating the hardware.

For example, the broadcast or multicast is used to find a nearby device and nearby service, like NetBIOS used in Windows™, which is an OS of Microsoft Corporation, and UPnP standardized by UPnP Forum. The conventional remote control technique has a problem: if a remote computer does not belong to the same IP subnetwork as the terminal at hand does, broadcast packets cannot be transmitted and received between the remote computer and a computer in the neighborhood of the terminal at hand, and the remote computer cannot find a device and service in the neighborhood of the terminal at hand. Even in the case of a protocol using the multicast for finding a device or service, the TTL of a multicast packet is set to a small value or the network does not support transfer of a multicast packet in many cases. This results in a problem that the remote computer cannot find a device or service in the neighborhood of the terminal at hand. Even if there is an UPnP AV server that retains video contents in the neighborhood of the terminal at hand, therefore, the remote computer cannot find the UPnP AV server, resulting in a problem that the video contents in the UPnP AV server cannot be displayed on the terminal at hand.

A similar problem exists in the above-described Japanese Patent Application Laid-Open Publication No. 2003-288536 as well. The remote map data server cannot find a device in the neighborhood of the car navigation terminal. Therefore, information utilizing service provided by the device cannot be displayed on the car navigation terminal at hand.

It is possible in the conventional technique to set, for example, an L2TP tunnel between the terminal at hand and the remote computer and conduct simulation so as to cause the remote computer to belong to the same subnetwork as the terminal at hand does in order to find service in the neighborhood of the terminal at hand. In this case, however, data communication conducted when the remote computer uses service in the neighborhood of the terminal at hand also passes through an L2TP tunnel. This results in a problem that the terminal at hand must conduct tunnel transfer processing of data communication with the remote computer. Especially, as the network becomes fast and the data quantity in data communication becomes large, the processing load becomes heavy and the CPU power with which the terminal at hand should be equipped also increases, resulting in a problem.

If the quantity of data communication conducted by the remote computer is increased by sophistication of application, the user must upgrade the processing capability of the terminal at hand. This results in a problem of complication.

SUMMARY OF THE INVENTION

According to an aspect of the present invention, there is provided with an information processing server that communicates with a terminal device connected to a first network and is connected to a second network different from the first network, comprising: a tunnel setter configured to set a tunnel with the terminal device; a reception unit configured to receive a broadcast or multicast packet output from one or more service providing servers on the first network, via the tunnel; a server finding unit configured to find service providing servers on the first network and services provided by the service providing servers, based on the received broadcasts or multicast packets; a notification unit configured to notify the terminal device of the services found, via the tunnel or the second network; and a data communication unit configured to be responsive to an execution request of the service from the terminal device via the tunnel or the second network to conduct data communication concerning the service with a service providing server providing the service via the second network.

According to an aspect of the present invention, there is provided with a remote control system including a terminal device connected to a first network and an information processing server connected to a second network, wherein the terminal device comprises: a first tunnel setter configured to set a tunnel with the information processing server; and a transfer unit configured to receive a broadcast or multicast packet output from one or more service providing servers on the first network and transmits the received broadcast or multicast packets to the information processing server via the tunnel, and the information processing server comprises: a second tunnel setter configured to set the tunnel with the terminal device; a reception unit configured to receive the broadcast or multicast packets from the terminal device via the tunnel; a server finding unit configured to find service providing servers on the first network and services provided by the service providing servers, based on the received broadcast or multicast packets; a notification unit configured to notify the terminal device of the services found, via the tunnel or the second network; and a data communication unit configured to be responsive to an execution request of the service from the terminal device via the tunnel or the second network to conduct data communication concerning the service with a service providing server providing the service via the second network.

According to an aspect of the present invention, there is provided with a remote control method using a terminal device connected to a first network and an information processing server connected to a second network, comprising: setting a tunnel between the terminal device and the information processing server; transmitting a broadcast or multicast packet output from one or more service providing servers on the first network to the information processing server via the tunnel to cause the information processing server to find the service providing servers and services provided by the service providing servers; notifying the terminal device of the services found, from the information processing server via the tunnel or the second network; and if execution request of the service is received by the information processing server from the terminal device via the tunnel or the second network, conducting data communication concerning the service between a service providing server providing the service and the information processing server, via the second network.

BRIEF DESCRIPTION OF THE DRAWINGS

FIG. 4 shows a format example of a session connection request;

FIG. 5 shows a format example of communication parameters;

FIG. 6 shows a format example of an authentication request;

FIG. 7 shows a format example of an authentication response;

FIG. 8 shows a format example of a session connection rejection;

FIG. 9 shows a format example of a session connection response;

FIG. 10 shows a format example of a session connection acknowledgement;

FIG. 13 shows a format example of an address notice;

FIG. 14 shows a format example of an encapsulated packet;

DETAILED DESCRIPTION OF THE INVENTION

Hereafter, embodiments of the present invention will be described with reference to the drawings.

Figure 1:
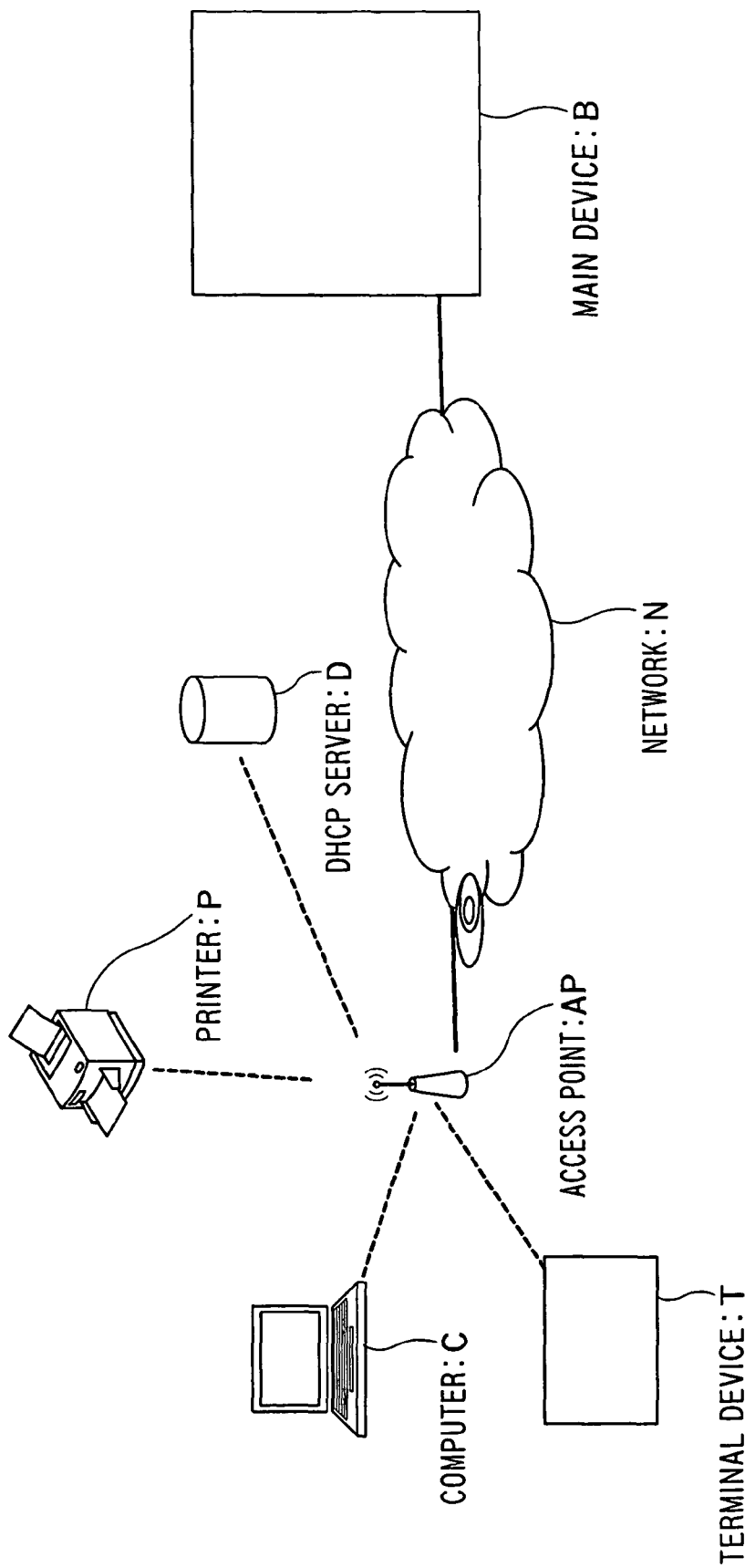
FIG. 1 is a diagram showing a typical configuration of an embodiment according to the present invention.

FIG. 1 is a diagram showing a typical configuration of an embodiment according to the present invention.

An access point AP, a terminal device T, a printer (service providing server) P, a computer (service providing server) C, and a DHCP server D are connected to each other via wireless links (first network). The access point AP and a main device (information processing server) B are connected to each other via a network (second network) N.

The access point AP conducts wireless communication by typically using a wireless protocol prescribed in IEEE 802.11a, b or g. Alternatively, a different wireless scheme may also be used. Furthermore, the terminal device T, the printer P, the computer C, and the main device B conduct communication to each other by typically using IPv4 (Internet Protocol version 4, hereafter referred to as IP). Alternatively, the protocol may be, for example, IPv6 or another protocol. The network N typically includes at least one router. The access point AP has a function of transferring packets from the network N to the wireless links and transferring packets from the wireless links to the network N. This transfer is conducted by the Ethernet bridging function without referring to header information in IPv4 packets.

Figure 2:
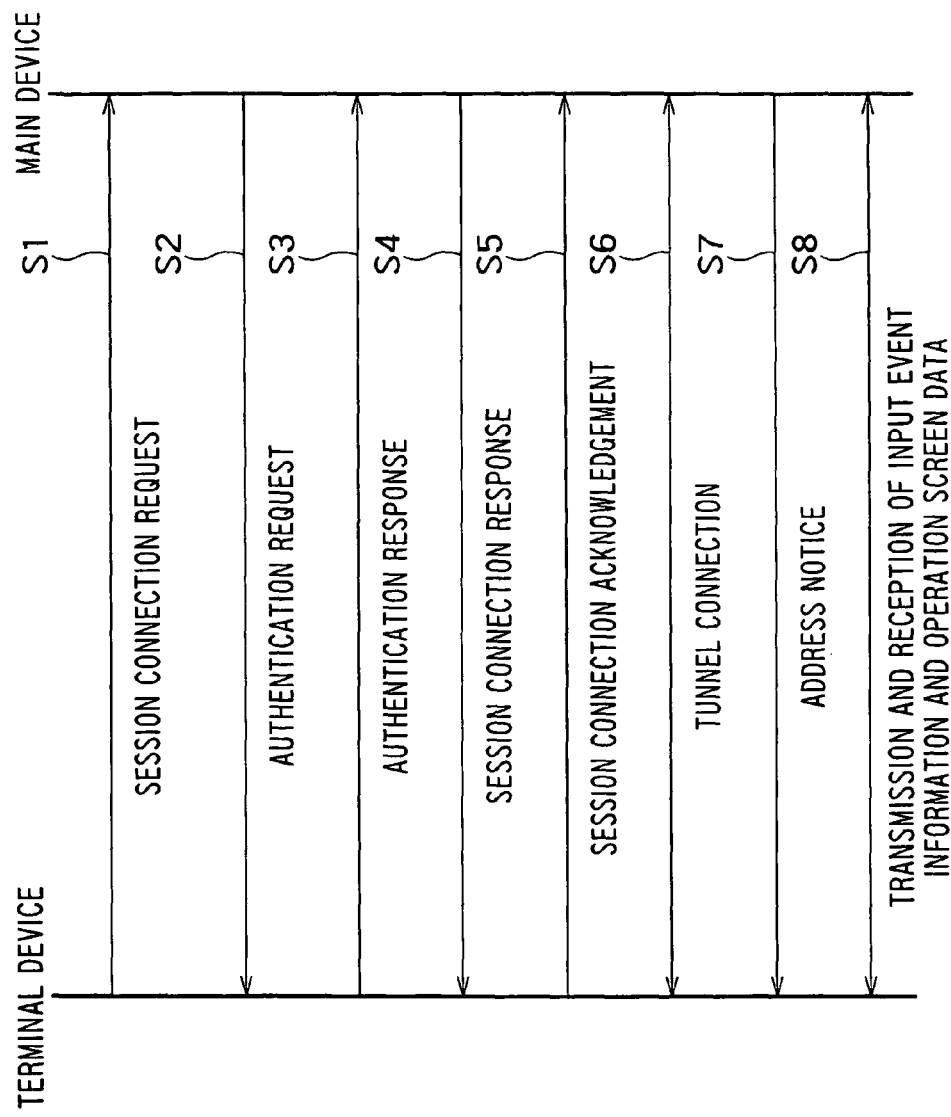
FIG. 2 is a diagram showing operation of connection between a terminal device T and a main device B.

Operation of connection between the terminal device T and the main device B will now be described with reference to FIG. 2.

After having established a wireless link with the access point AP, the terminal device T acquires an IP address from, for example, the DCHP server D by using a DHCP function. Upon acquiring an IP address At, the terminal device T establishes a session with the main device B. A sequence used when establishing a session is shown in FIG. 2. The terminal device T transmits a session connection request toward the IP address of the main device B previously retained (S1).

This session connection request contains an IP address (At) of the terminal device T, a user identifier of a user using the terminal device T, and communication parameters of the terminal device T. FIG. 4 shows a format example of the session connection request.

Here, the communication parameters contain a protocol identifier, an encoding rate, and a screen size. These three items form an entry. A plurality of entries can be described. The terminal device T enumerates usable entries.

The number of described entries is described in a field indicating the number of entries.

FIG. 5 shows a format example of the communication parameters. In an example of the communication parameters, the protocol identifier, the encoding rate, and the screen size are MPEG2-TS, 4 Mbps, and 680×480, respectively.

Upon receiving the session connection request, the main device B transmits an authentication request to the IP address of the terminal device T contained in the session connection request (S2). The authentication request contains an IP address (Ab) of the main device B, an authentication algorithm identifier, and a challenge parameter. FIG. 6 shows a format example of the authentication request.

Upon receiving the authentication request, the terminal device T calculates an authentication response value by using an algorithm indicated by the authentication algorithm identifier on the basis of the challenge parameter and a previously given password. After the calculation, the terminal device T transmits an authentication response toward the main device B (S3). For calculating the authentication response value, for example, a method of concatenating the challenge parameter and the password and finding a message digest by using an MD5 algorithm on the basis of the concatenated challenge parameter and password can be used. The MD5 algorithm is described in detail in IETF RFC1321.

This authentication response contains the IP address (At) of the terminal device T, an authentication algorithm identifier, the user identifier of the user using the terminal device T, a challenge parameter, and an authentication response value. FIG. 7 shows a format example of the authentication response.

Upon receiving the authentication response, the main device B calculates the authentication response value according to a procedure similar to that of the terminal device T, and ascertains whether the calculated authentication response value coincides with the authentication response value in the authentication response. In the case of noncoincidence, the main device B transmits a session connection rejection to the terminal device T. A format of the session connection rejection is shown in FIG. 8. In the case of coincidence, the main device B transmits a session connection response to the terminal device T (S4). This session connection response contains the IP address (Ab) of the main device B, a session port number of the main device, and communication parameters. In the communication parameters, parameters that are contained in the communication parameters described in the session connection request and that can be used by the main device B are enumerated. FIG. 9 shows a format example of the session connection response.

Upon receiving the session connection response, the terminal device T transmits a session connection acknowledgement to the main device B (S5).

This session connection acknowledgement contains the IP address (At) of the terminal device T, a session port number of the terminal device T, and communication parameters. In the communication parameters, the terminal device describes one entry that is contained in the communication parameters described in the session connection response and that is the most favorite. FIG. 10 shows a format example of the session connection acknowledgement.

Upon receiving the session connection acknowledgement, the main device B transmits operation screen data of the main device B toward the IP address and the session port number of the terminal device T in the session connection acknowledgement by using the UDP and using, for example, MPEG2-TS (S8). Upon receiving the operation screen data from the main device B, the terminal device T displays image data contained in the operation screen data on a display included in the terminal device T and outputs voice data contained in the operation screen data to a speaker included in the terminal device T.

Upon receiving data from a keyboard or mouse included in the terminal device T, the terminal device T transmits the input event information toward the IP address and the session port number of the main device B contained in the session connection response by using the UDP (S8).

Upon receiving the input event information from the terminal device T, the main device B conducts processing according to the input event information as if the input event information is input from the keyboard or mouse included in the main device B.

Owing to the processing described heretofore, it becomes possible to control the main device B by using an input device such as a keyboard or mouse included in the terminal device T. It becomes possible to display the screen of the main device B on the terminal device T.

Figure 3:
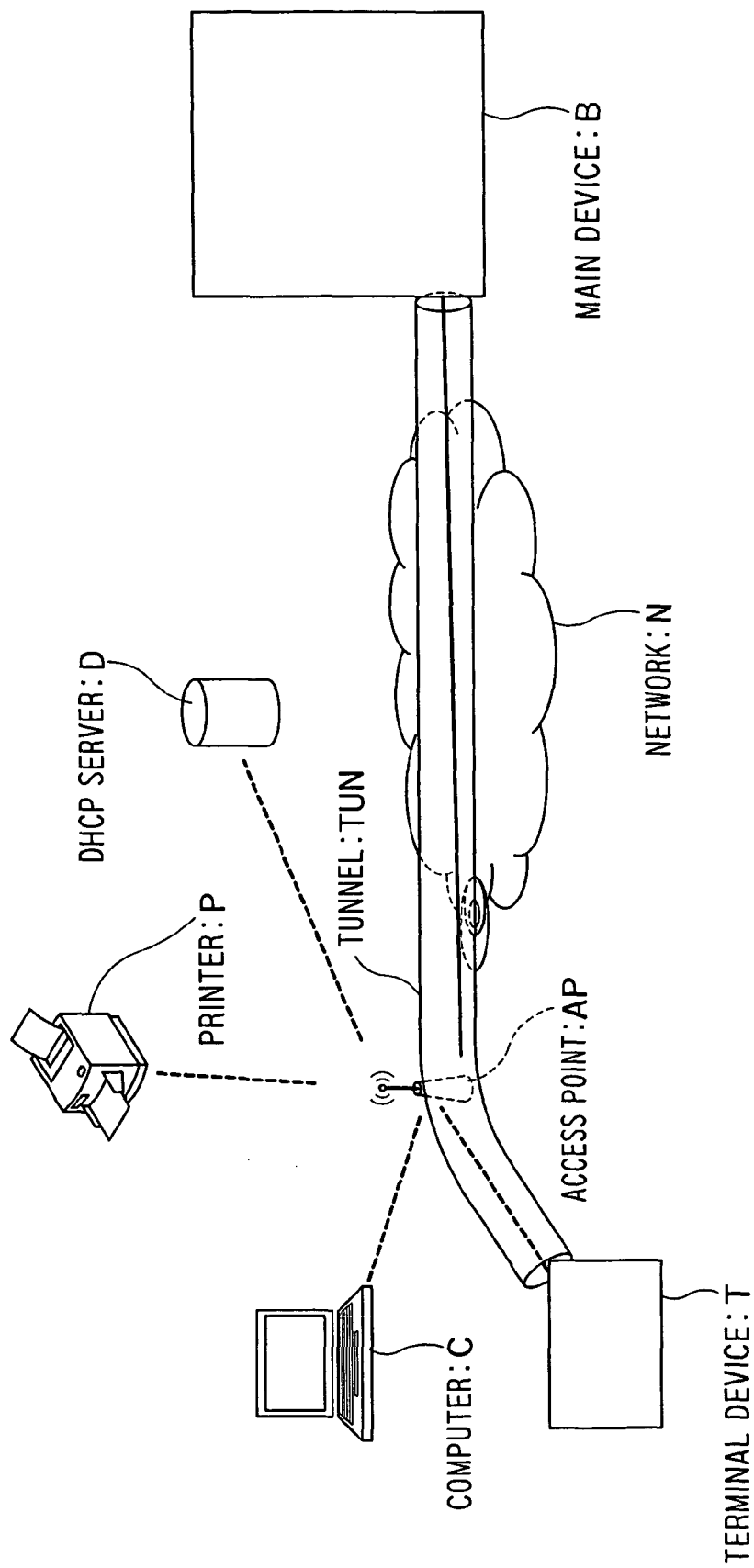
FIG. 3 shows a state in which a tunnel TUN is set between the main device B and the terminal device T.

In addition, the main device B sets a tunnel between the main device B and the terminal device T by using the IP address of the terminal device T contained in the session connection acknowledgement (S6). FIG. 3 shows a state in which a tunnel TUN has been set between the main device B and the terminal device T. In general, forming a virtual communication path between two points on the network by carrying a packet according to a certain protocol as a data portion of a packet according to a different protocol or the same protocol is referred to as tunneling. The virtual communication path is referred to as tunnel. For example, it indicates carrying a packet of a protocol with regard to the link layer such as an Ethernet frame with the packet being included in a packet of a protocol with regard to the network layer such as an IP packet. Here, it is supposed that a tunnel has been set by using, for example, L2TP. A concrete procedure of the L2TP (Layer 2 Tunneling Protocol) is described in detail in "VPN/VLAN textbook" written by Haruki Koretomo and edited by Multimedia Communication Research Society, or an IETF draft "draft-ietf-l2tpext-l2tp-base-15." After the tunnel TUN has been set, the main device B acquires an IP address Ab' from the DHCP server D via the tunnel TUN (through the terminal device T) by using the DHCP function. Hereafter, this address is referred to as main device tunnel address. Upon acquiring the main device tunnel address, the main device B transmits an address notice containing a value of the address to the terminal device T (S7).

FIG. 13 shows a format example of the address notice.

The address notice has a main device IP address field and a main device Ether address field. A main device tunnel address is described in the main device IP address field. An Ether address of the main device is described in the main device Ether address field.

After the terminal device T has received the address notice, the terminal device T transfers a packet directed to the main device tunnel address and multicast and broadcast packets to the main device B via the tunnel TUN.

As a result, the main device B can belong to the same subnetwork as the terminal device T does, via the tunnel TUN. Therefore, the main device B can receive a broadcast packet and a multicast packet arriving at the terminal device T, and transmit a broadcast packet and a multicast packet to the same range as that of the terminal device T. Hereafter, this will be described concretely by taking UPnP as an example.

Figure 11:
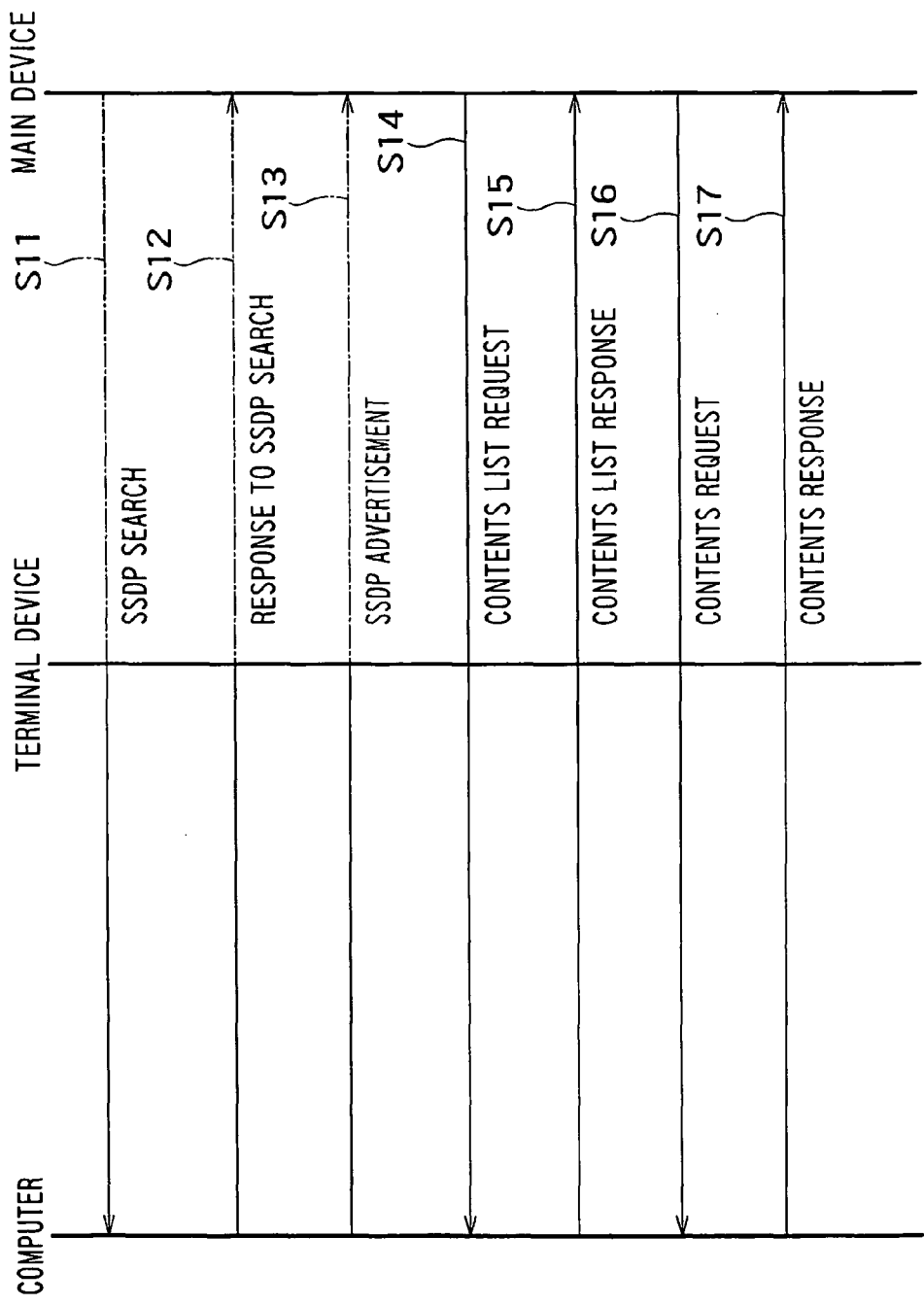
FIG. 11 is a diagram showing an operation sequence in the case where the UPnP is used.

FIG. 11 is a diagram showing an operation sequence in the case where the UPnP is used. In FIG. 11, portions using the tunnel TUN are indicated by dotted lines, whereas other portions are indicated by solid lines.

For example, it is now supposed that the computer C provides video contents by using the UPnP. The main device B transmits SSDP SEARCH via the tunnel TUN by using the multicast to search for a computer that retains video contents (S11). The address Ab' is used as the source address of the SSDP SEARCH at this time. Upon receiving the SSDP SEARCH, the computer C returns an answer to the SSDP SEARCH toward Ab' described in its source address (S12). As a result, the main device B can find the computer C.

The computer C periodically transmits SSDP ADVERTISEMENT by using multicast to advertise itself. The terminal device T transfers SSDP ADVERTISEMENT to the main device B via the tunnel TUN (S13). As a result, the main device B can receive the SSDP ADVERTISEMENT. Therefore, the main device B can find the computer C.

In addition, the main device B transmits a contents list request toward the computer C by using unicast (S14). By using Ab as the source address at this time, the main device B can receive a contents list response from the computer C without passing through the terminal device T (S15).

The main device B transmits a contents request for contents contained in a contents list toward the computer C by using unicast (S16). By using Ab as the source address at this time, its contents response (response from the computer C) can be received without passing through the terminal device T (S17).

It is possible to decode the contents thus acquired in the main device B, encode the decoded contents into a format for the terminal T, and transmit a result to the terminal device T via the tunnel TUN or not via the tunnel TUN (i.e. via second network).

Here, operation of the main device B and the terminal device T has been described taking the UPnP as an example of a protocol to be used. However, the application range of the present invention is not restricted to the UPnP. There are a large number of protocols for finding a device by using the multicast or broadcast and then conducting communication with the found device by using the unicast, and the present invention can be applied to them. As a different example, NetBIOS/SMB used in Windows, which is an OS of Microsoft Corporation, can also be mentioned.

If a packet is sent from the computer C toward the address Ab' of the main device B, the terminal device T sends this packet to the main device B via the tunnel TUN. In a response packet to the packet having Ab' as its destination address, the address Ab' is described as the source address by the main device B.

Figure 12:
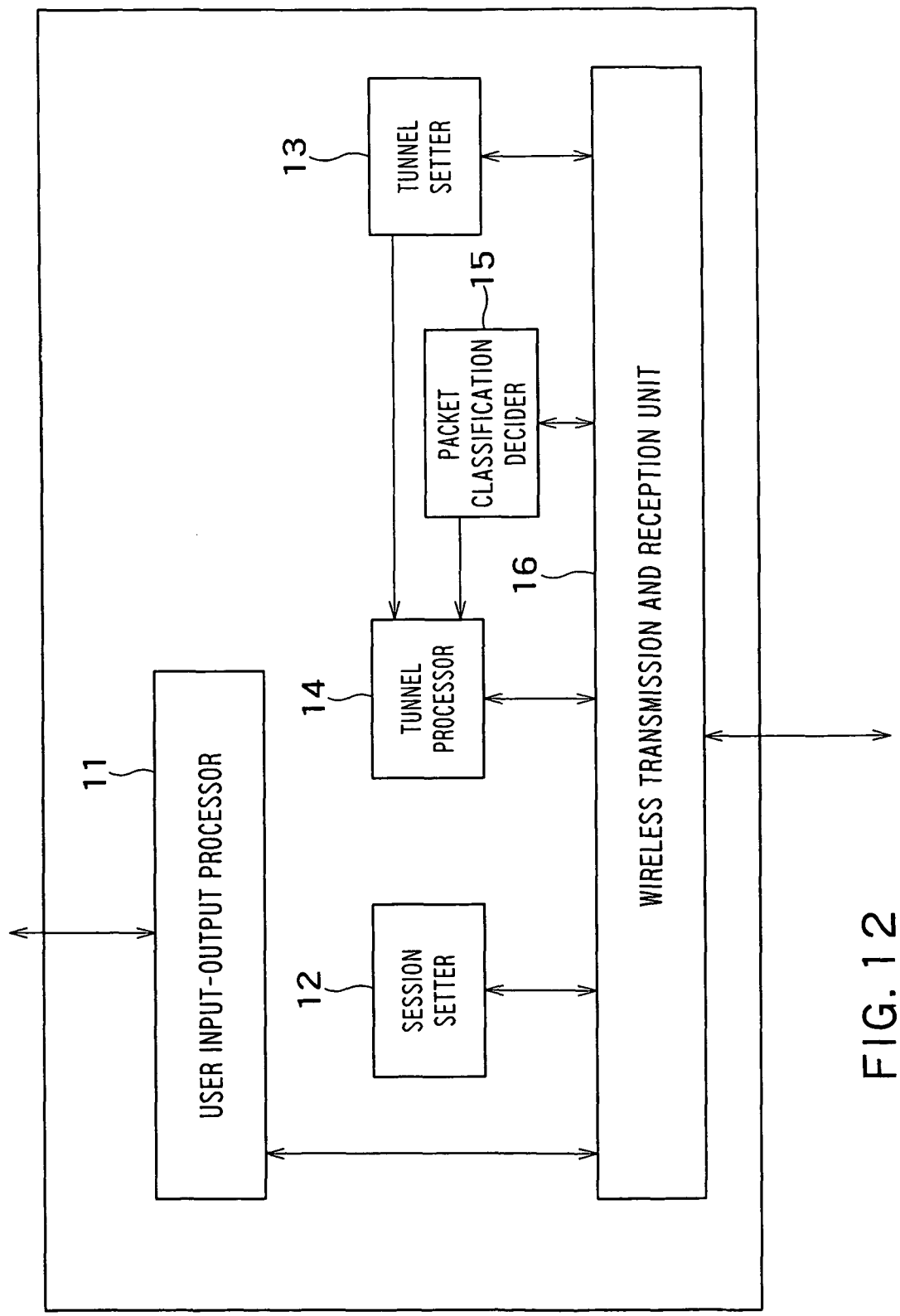
FIG. 12 shows a configuration example of the terminal device T.

A configuration example of the terminal device T will now be described with reference to FIG. 12.

The terminal device T includes a user input-output processor 11, a session setter 12, a tunnel setter 13, a tunnel processor 14, a packet classification decider 15, and a wireless transmission and reception unit 16.

The wireless transceiver unit 16 conducts establishment of a wireless link, processing of conducting communication with the DHCP server and acquiring an IP address, and packet transmission and reception processing to be conducted via the wireless link.

Upon receiving a notice to the effect that an IP address has been acquired, from the wireless transmission and reception unit 16, the session setter 12 generates a session connection request containing the IP address received from the wireless transmission and reception unit 16, a user identifier of the user previously set, and communication parameters previously set, and transmits the session connection request toward the IP address of the main device B previously set, via the wireless transmission and reception unit 16.

Upon receiving the authentication request via the wireless transmission and reception unit 16, the session setter 12 generates an authentication response. The authentication response contains an IP address received from the wireless transmission and reception unit 16, an authentication algorithm identifier contained in the authentication request, a user identifier of the user previously set, a challenge parameter contained in the authentication request, and an authentication response value calculated using an algorithm indicated by the authentication algorithm identifier on the basis of the challenge parameter contained in the authentication request and a previously set password. The session setter 12 transmits the authentication response toward the source address and the source port of the authentication request via the wireless transmission and reception unit 16.

Upon receiving a session connection response via the wireless transmission and reception unit 16, the session setter 12 generates a session connection acknowledgement. The session connection acknowledgement contains an IP address received from the wireless transmission and reception unit 16, a session port number previously set, and predetermined communication parameters having the highest priority among the communication parameters contained in the session connection response. The session setter 12 transmits the session connection acknowledgement toward the source address and the source port of the authentication request via the wireless transmission and reception unit 16.

Upon receiving a control packet for setting the L2TP tunnel via the wireless transmission and reception unit 16, the tunnel setter 13 sets an L2TP tunnel in accordance with communication specifications of the L2TP.

Upon setting the tunnel, the tunnel setter 13 delivers parameters of the L2TP tunnel to the tunnel processor 14. The parameters contain a session ID, an address of the opposite party, a port number of the opposite party (a port number for tunnel data), an own address, and an own port number (a port number for tunnel data).

Upon receiving an address notice via the wireless transmission and reception unit 16, the packet classification decider 15 stores a main device IP address (main device tunnel address) and a main device Ether address.

Furthermore, the packet classification decider 15 passes the value of the main device Ether address to the wireless transmission and reception unit 16. Thereafter, the wireless transmission and reception unit 16 delivers Ether packets having the main device Ether address as the destination, Ether packets having a broadcast address as the destination, and Ether packets having an arbitrary multicast address as the destination, to the packet classification decider 15.

If the terminal device T uses 802.11a, b or g at this time, the terminal device T couples a connection-relation to the Ether address of the main device with the access point AP in order to cause the access point AP to transmit the Ether packet having the main device Ether address as the destination to the terminal device T.

Upon receiving the Ether packet having the main device Ether address as the destination, the Ether packet having a broadcast address as the destination, and the Ether packet having an arbitrary multicast address as the destination from the wireless transmission and reception unit 16, the packet classification decider 15 delivers them to the tunnel processor 14.

Here, the packet classification decider 15 may deliver only the Ether packets having the main device Ether address as the destination, the Ether packets having a broadcast address as the destination, and the Ether packets having a previously set multicast address as the destination to the tunnel processor 14.

Upon receiving a packet capsulated according to the L2TP from the wireless transmission and reception unit 16 (from the main device B), the tunnel processor 14 removes the Ether header, IP header, UDP header and L2TP header from the head of the packet, and transmits the remaining Ether header, IP header and data to a wireless link via the wireless transmission and reception unit 16.

Upon receiving a packet from the packet classification decider 15, the tunnel processor 14 adds an Ether header, an IP header, a UDP header, and an L2TP header to the packet, and transmits a resultant packet to a wireless link (toward the main device B) via the wireless transmission and reception unit 16. The format of the capsulated packet (format of packet for L2TP tunnel) is shown in FIG. 14. At this time, the Ether address of the own node is described in the source address of the Ether header, and an Ether address of a router (not illustrated) is described in the destination address. Furthermore, the address of the opposite party received from the tunnel setter 13 is described in the destination address of the IP header, and the own address received from the tunnel setter 13 is described in the source address. Furthermore, the port number of the opposite party received from the tunnel setter 13 is described in the destination port of the UDP header, and the own port number received from the tunnel setter 13 is described in the source port. The session ID received from the tunnel setter 13 is described in the session ID of the L2TP header.

Upon receiving operation screen data encoded according to, for example, MPEG2-TS from the main device B via the wireless transmission and reception unit 16, the user input-output processor 11 decodes the data into image data and voice data, outputs the image data to the display included in the terminal device T, and outputs the voice data to the speaker included in the terminal device T.

Upon receiving an input from the keyboard or mouse included in the terminal device T, the user input-output processor 11 encodes the input, and transmits the result to the main device B via the wireless transmission and reception unit 16 as input event information.

Figure 18:
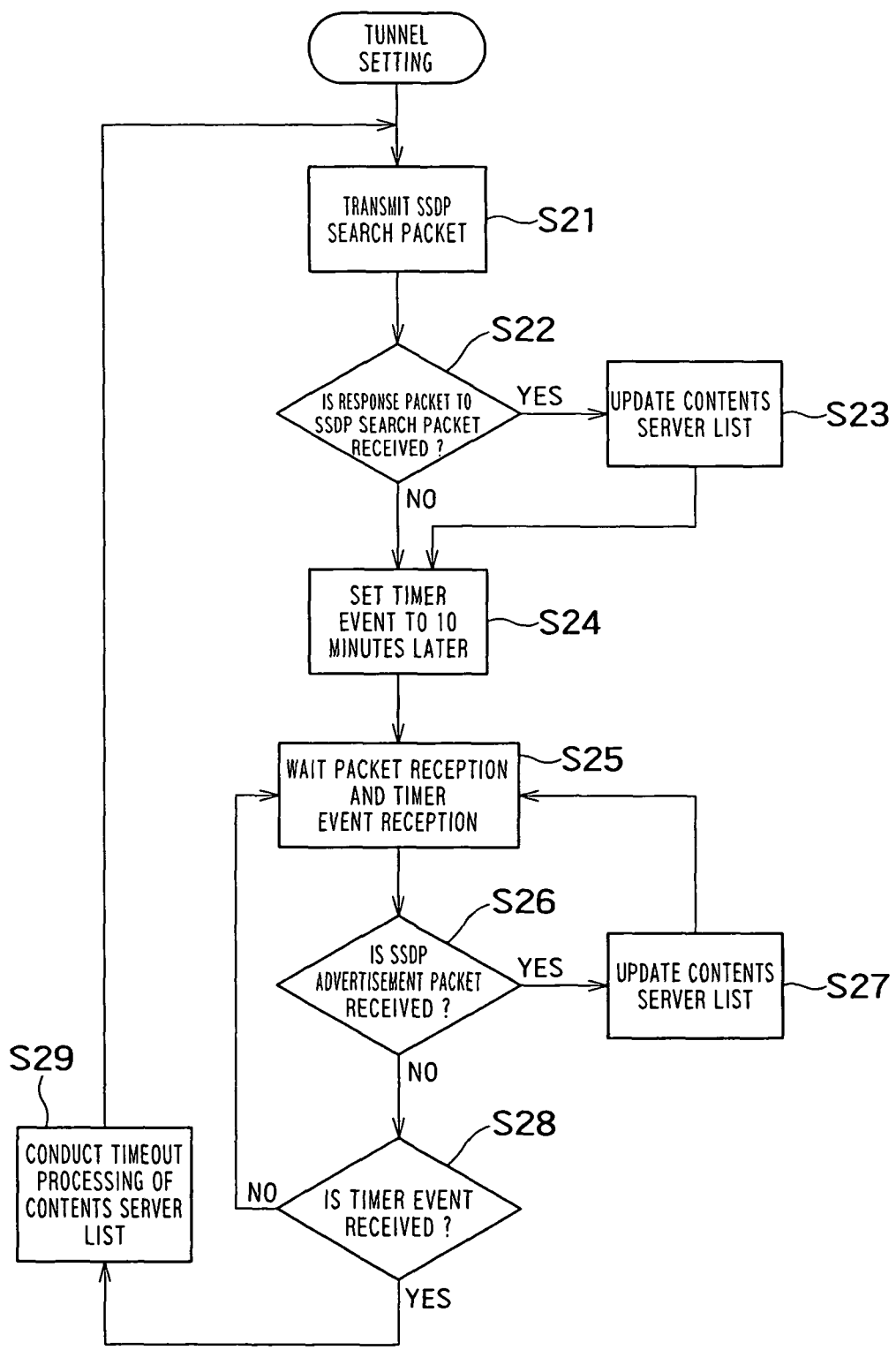
FIG. 18 shows a processing procedure for finding contents service by using the UPnP.

FIG. 18 shows a processing procedure for finding contents service using the UPnP (Universal Plug and Play) conducted by the main device B. Here, a computer that provides contents service is referred to as contents server.

Upon finishing the setting of the tunnel TUN, the main device B transmits an SSDP SEARCH packet via the tunnel TUN (S21). At this time, the destination address of the SSDP SEARCH packet is 239.255.255.250, and the source address is the main device tunnel address Ab'. Since the SSDP SEARCH packet is to be passed through the tunnel, the SSDP SEARCH packet is capsulated to the format shown in FIG. 14, and transmitted to the network N.

Subsequently, it is determined whether a response packet to the SSDP SEARCH packet has been received via the tunnel TUN (S22).

If the response packet to the SSDP SEARCH packet has been received (YES of S22), update processing of the contents server list is conducted (S23). The contents server list contains (device name, device IP address, lifetime, and contents directory control URL).

As for update processing of the contents server list, it is determined whether an entry having a device IP address that coincides with a source address of the response packet to the SSDP SEARCH packet is already present in the contents server list. If such an entry is present, the lifetime of the entry is rewritten to become time indicated in a CACHE-CONTROL field in the response packet to the SSDP SEARCH packet. On the other hand, if such an entry is not present, a new entry is added to the contents server list.

(Source address, and time indicated in the CACHE-CONTROL field) in the response packet to the SSDP SEARCH packet are described in (device IP address and lifetime) of the added entry. Values of (friendly Name and control URL) in a series of Description documents obtained by accessing a URL indicated by a LOCATION field in the response packet to the SSDP SEARCH packet are described in (device name and contents directory control URL) of the added entry.

Thereafter, or if the response packet to the SSDP SEARCH packet is not received (NO of S22), a timer event is set in a timer within the main device B ten minutes later (S24), and a packet reception and timer event reception waiting state is brought about (S25).

If a packet is received, it is determined whether the packet is an SSDP ADVERTISEMENT packet received via the tunnel TUN (S26). If the packet is an SSDP ADVERTISEMENT packet (YES of S26), contents server list update processing is conducted (S27) and the packet reception and timer event reception waiting state is brought about again (S25).

In the contents server list update processing, it is determined whether an entry of a device IP address coinciding with a source address of the SSDP ADVERTISEMENT packet is already present in the contents server list. If such an entry is present, lifetime in the entry is rewritten to become time indicated in a CACHE-CONTROL field of the SSDP ADVERTISEMENT packet.

If such an entry is not present, a new entry is added to the contents server list. (Source address, and time indicated in the CACHE-CONTROL field) in the SSDP ADVERTISEMENT packet are described in (device IP address and lifetime) of the added entry. Values of (friendly Name and control URL) in a series of Description documents obtained by accessing a URL indicated by a LOCATION field in the SSDP ADVERTISEMENT packet are described in (device name and contents directory control URL) of the added entry.

If the packet is not the SSDP ADVERTISEMENT packet (NO of S26), it is determined whether a timer event is received (S28). If the timer event is not received (NO of S28), the packet reception and timer event reception waiting state is brought about again (S25).

On the other hand, if the timer event is received (YES of S28), timeout processing of the contents server list is conducted (S29).

In the timeout processing of the contents server list, 10 minute is subtracted from the lifetime of each entry in the contents server list. In addition, entries that are 0 or less in lifetime after the subtraction are deleted.

Thereafter, the SSDP SEARCH packet is transmitted via the tunnel TUN again (S21).

Owing to the operation heretofore described, it becomes possible for the main device B to find contents service in the neighborhood of the terminal device T via the tunnel TUN and retain a list of contents servers that provide the contents service.

Figure 19:
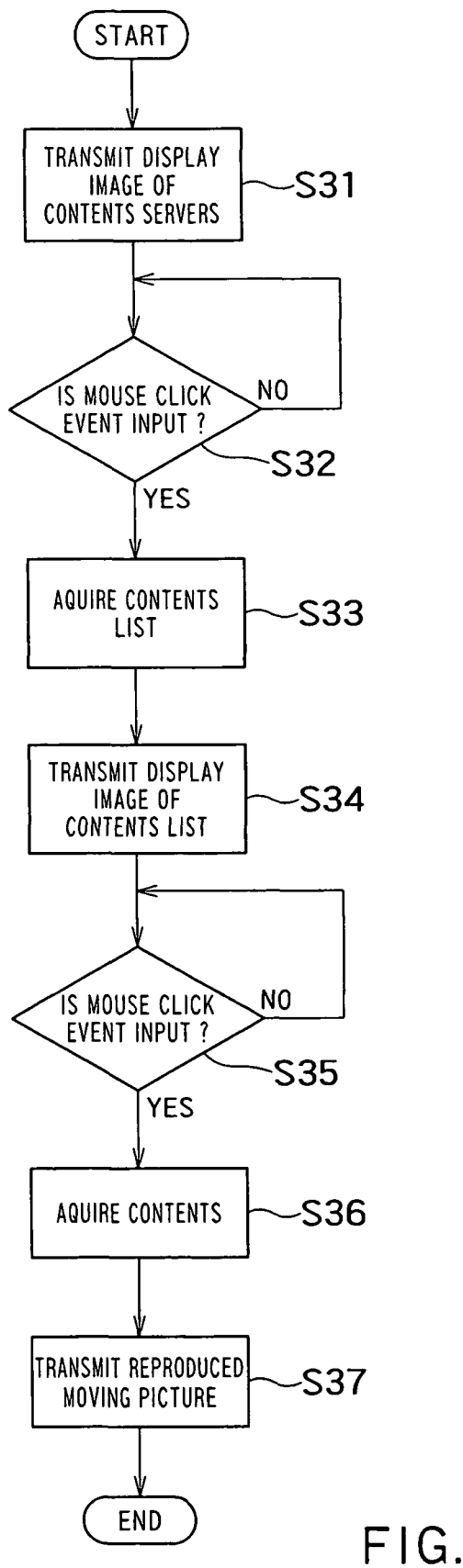
FIG. 19 shows a flow of processing conducted when the main device B conducts moving picture reproduction by utilizing contents service.

FIG. 19 shows a flow of processing at the time when the main device B conducts moving picture reproduction by utilizing the contents service.

The main device B transmits display images (identifiers) of icons of contents servers of all entries in the contents list to the terminal device T (S31).

Figure 20:
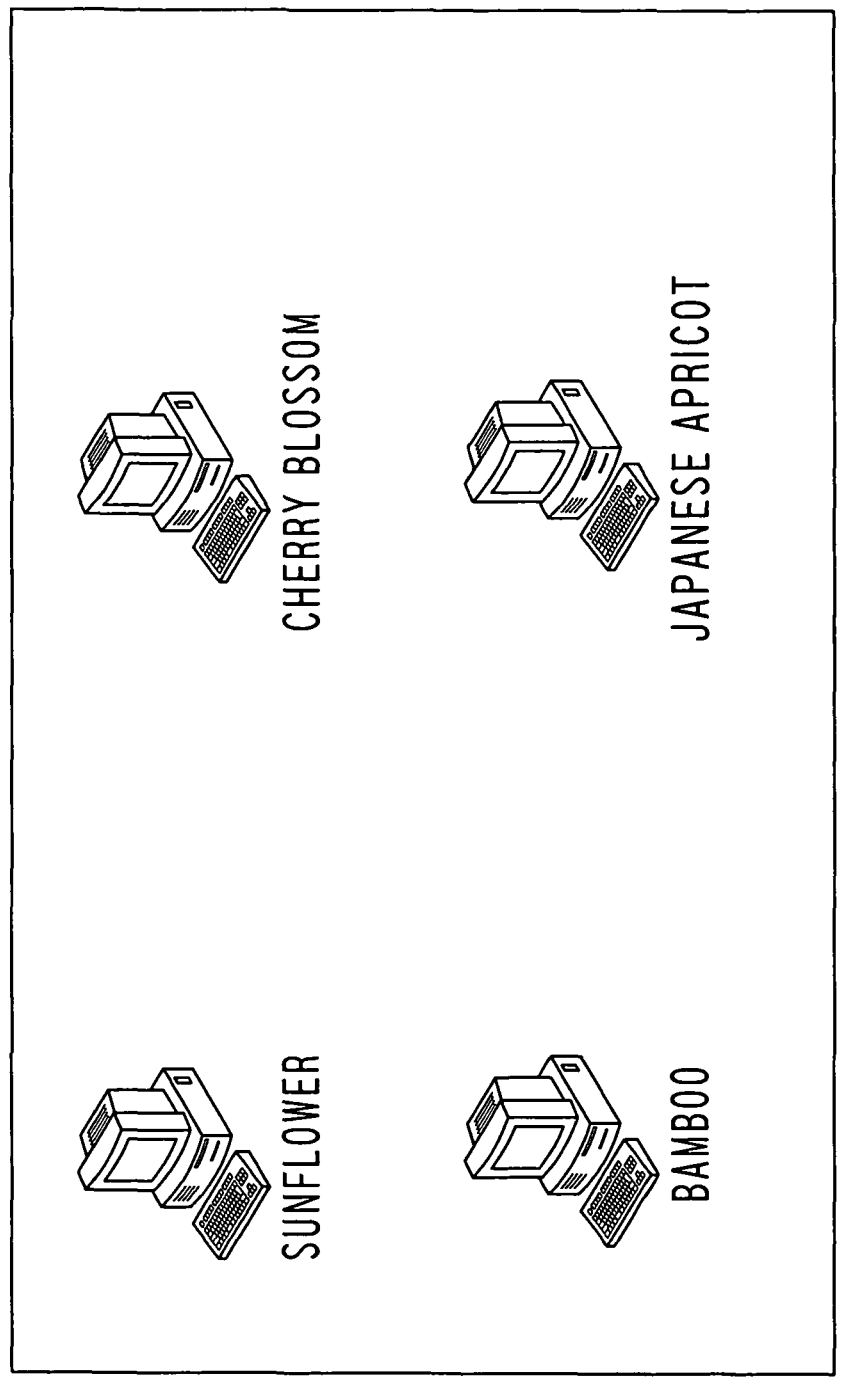
FIG. 20 shows an example of a display image of icons in a contents server.

FIG. 20 shows a display image example of icons of contents servers transmitted by the main device B. In FIG. 20, there are four entries in the contents list in the main device B, and device names are "Sunflower," "Cherry blossom," "Bamboo" and "Japanese apricot."

If a mouse click event is input from the terminal device T to the main device B (YES of S32), the main device B acquires a contents list from a subject contents server subjected to mouse click (S33).

Acquisition of the contents list is conducted by transmitting a contents list acquisition request to a contents directory control URL of the pertinent entry in the contents server list. The contents list acquisition request is transmitted without being passed through the tunnel. Its destination address is a device IP address of the contents server, and its source address is the IP address Ab of the main device B.

After the main device B has acquired the contents list, the main device B transmits the display image (identifiers) of the contents list to the terminal device T (S34).

Figure 21:
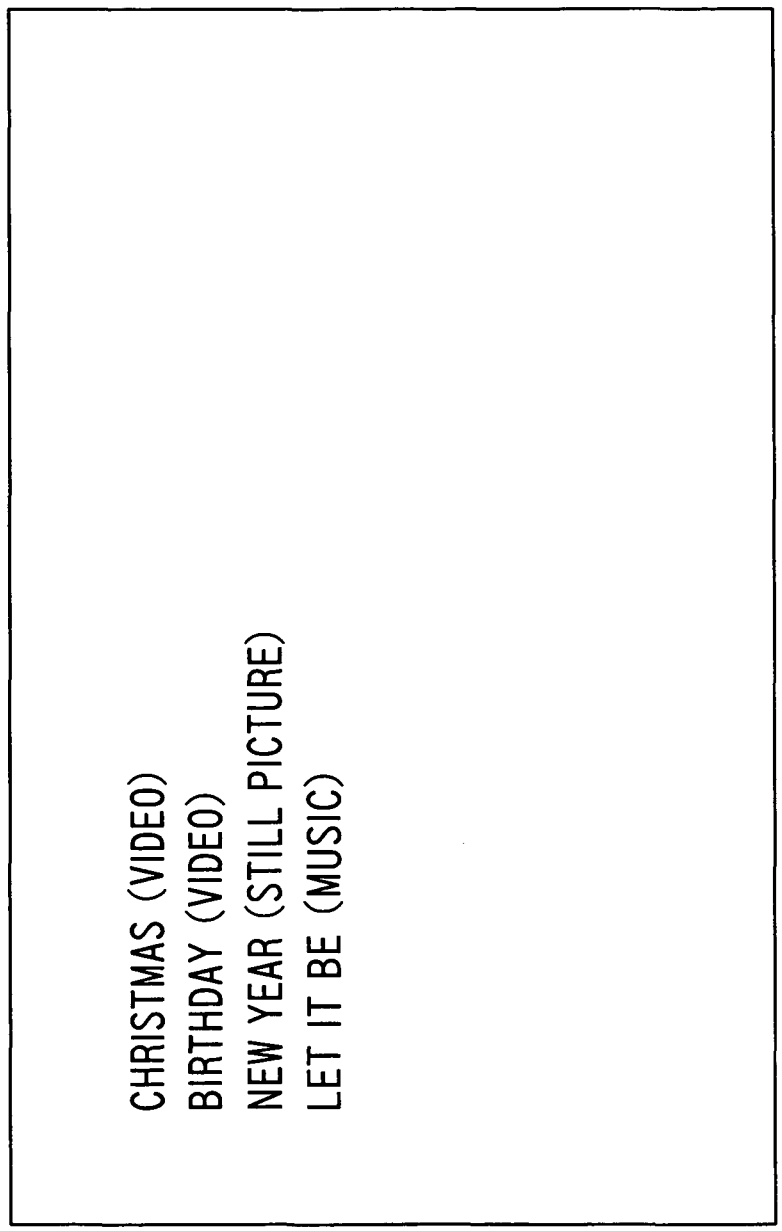
FIG. 21 shows an example of a display image of a contents list.

FIG. 21 shows an example of a display image of the contents list. Titles of two moving pictures, a title of one still picture, a title of one piece of music, and contents classifications retained by the contents server are displayed.

If a mouse click event is input from the terminal device T (YES of S35), the main device B transmits a contents acquisition request for a contents title that is the subject of the mouse click, and acquires contents (S36). The contents contain still picture data, moving picture data, voice data, document data, or an arbitrary combination of them.

The contents acquisition request is transmitted without being passed through the tunnel. Its destination address is a device IP address, and its source address is the IP address Ab of the main device B.

If the contents are, for example, a moving picture, the main device B transmits a displayed image of the moving picture to the terminal device T (S37).

Figure 15:
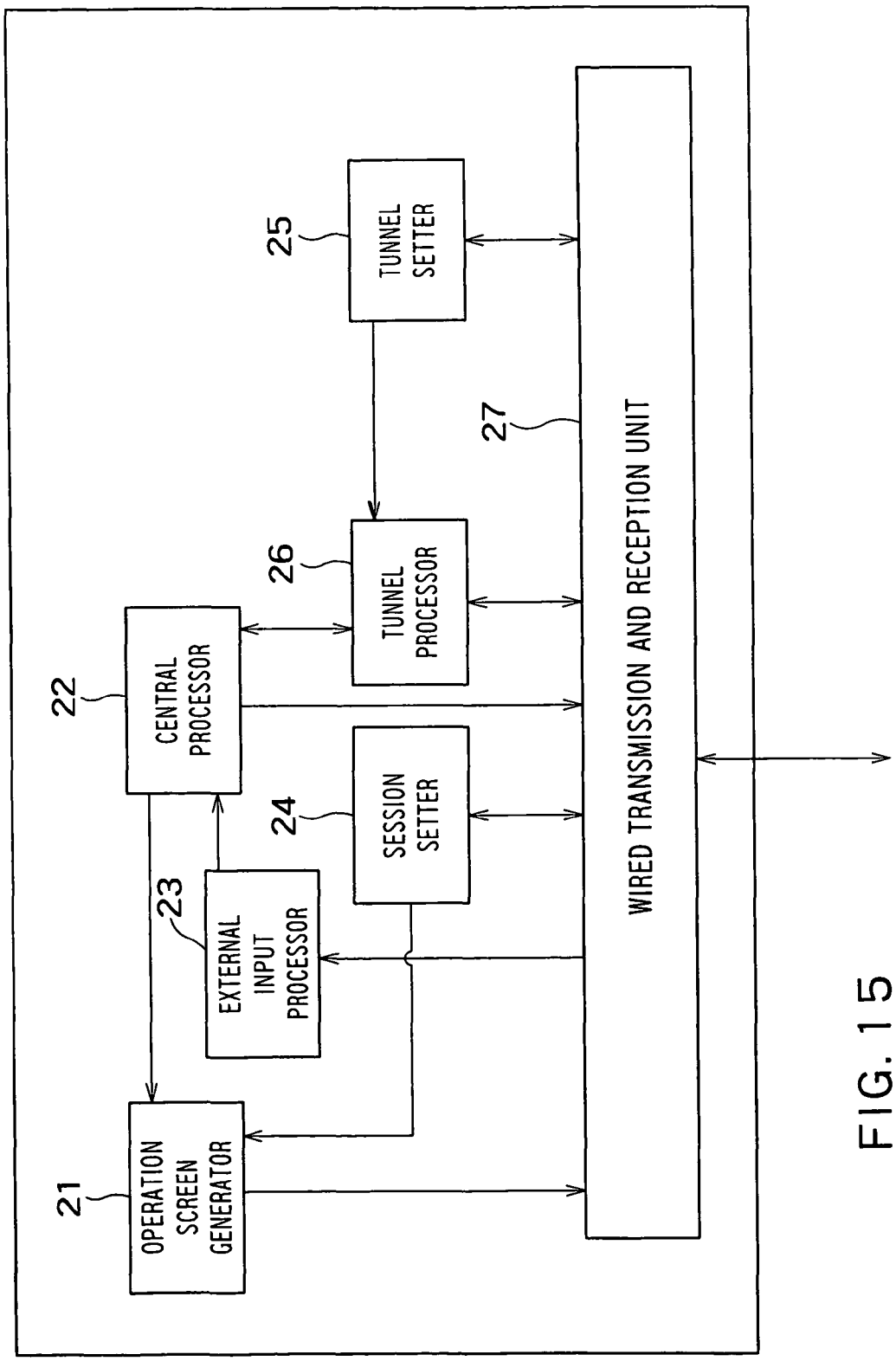
FIG. 15 shows a configuration example of the main device B.

A configuration example of the main device B will now be described with reference to FIG. 15.

The main device B includes an operation screen generator 21, a central processor 22, an external input processor 23, a session setter 24, a tunnel setter 25, a tunnel processor 26, and a wired transmission and reception unit 27.

The wired transmission and reception unit 27 conducts transmission and reception processing of a packet.

Upon receiving a packet from the outside, the wired transmission and reception unit 27 conducts inspection on the packet.

If a protocol number in its IP header indicates the UDP and its UDP destination port indicates a previously given number for session setting, the wired transmission and reception unit 27 delivers the packet to the session setter 24.

If the protocol number in its IP header indicates the UDP and its UDP destination port indicates a session port number given by the session setter 24 (a port number for data communication using an established session), the wired transmission and reception unit 27 delivers the packet to the external input processor 23.

If the protocol number in its IP header indicates the UDP and its UDP destination port indicates a previously given number for tunnel setting, the wired transmission and reception unit 27 delivers the packet to the tunnel setter 25.

If the protocol number in its IP header indicates the UDP and its UDP destination port indicates a number given by the tunnel setter 25 (a port number for tunnel data), the wired transmission and reception unit 27 delivers the packet to the tunnel processor 26.

The wired transmission and reception unit 27 delivers other packets to the central processor 22.

Upon receiving a session connection request via the wired transmission and reception unit 27, the session setter 24 transmits an authentication request toward the terminal device T via the wired transmission and reception unit 27. The authentication request contains a previously set IP address of the own node, a previously set authentication algorithm identifier, and a previously set challenge parameter.

Upon receiving an authentication response via the wired transmission and reception unit 27, the session setter 24 calculates an authentication response value by using an algorithm indicated by the authentication algorithm identifier on the basis of the challenge parameter contained in the authentication response and a password. The session setter 24 determines whether the calculated authentication response value coincides with an authentication response value contained in the authentication response.

In the case of noncoincidence, the session setter 24 generates a session connection rejection having a description of a user identifier contained in the authentication response, and transmits the session connection rejection to the terminal device T via the wired transmission and reception unit 27.

If the two authentication response values coincide with each other, the session setter 24 generates a session connection response and transmits the session connection response to the terminal device T via the wired transmission and reception unit 27. The session connection response contains a previously set IP address of the own node, a previously set port number (session port number) of the own node, and communication parameters that are common to a plurality of previously set communication parameters and communication parameters contained in the session connection request.

Upon receiving a session connection acknowledgement via the wired transmission and reception unit 27, the session setter 24 delivers communication parameters, an IP address of the terminal device T and a session port number contained in the session connection acknowledgement to the operation screen generator 21.

Furthermore, the session setter 24 delivers the previously set port number (session port number) of the own node to the wired transmission and reception unit 27.

Upon receiving a control packet for L2TP tunnel setting via the wired transmission and reception unit 27, or after the tunnel setter 25 has received the session connection acknowledgement, the tunnel setter 25 sets the L2TP tunnel according to the communication specifications of the L2TP.

If the tunnel is set, the tunnel setter 25 delivers a session ID, an address of the opposite party, a port number of the opposite party (a port number for tunnel data), an own address, and an own port number (a port number for tunnel data), which are parameters of the L2TP tunnel, to the tunnel processor 26.

Furthermore, the tunnel setter 25 delivers the own port number to the wired transmission and reception unit 27.

Upon receiving a packet capsulated according to the L2TP from the wired transmission and reception unit 27, the tunnel processor 26 removes the Ether header, IP header, UDP header, and L2TP header from the head of the packet, and delivers the remaining Ether header, IP header and data to the central processor 22.

Furthermore, upon receiving an Ether packet from the central processor 22, the tunnel processor 26 adds an Ether header, an IP header, a UDP header and an L2TP header to the Ether packet. The tunnel processor 26 transmits a resultant Ether packet to the network N via the wired transmission and reception unit 27. At this time, an Ether address of the own node is described in a source address of the Ether header and an Ether address of a router (not illustrated) is described in a destination address of the Ether header. Furthermore, the address of the opposite party received from the tunnel setter 25 is described in a destination address of the IP header, and the own address received from the tunnel setter 25 is described in a source address of the IP header. The port number of the opposite party received from the tunnel setter 25 is described in a destination port of the UDP header, and the own port number received from the tunnel setter 25 is described in a source port of the UDP header. The session ID received from the tunnel setter 25 is described in a session ID of the L2TP header.

Upon receiving input event information from the terminal device T via the wired transmission and reception unit 27, the external input processor 23 decodes the input event information and transmits the result to the central processor 22.

Upon receiving screen information and voice information from the central processor 22, the operation screen generator 21 encodes them according to the communication parameters received from the session setter 24, and transmits a result toward the IP address and the session port number received from the session setter 24, via the wired transmission and reception unit 27.

The central processor 22 is operating a predetermined program that operates according to the input event information given from the external input processor 23. It is desirable that this program is a basic program. The central processor 22 operates, manipulates and stops a previously retained application program in accordance with the input event information given from the external input processor 23.

As a result, the basic program or an application program can be operated as if the mouse or keyboard of the terminal device T is equipped with the main device.

The central processor 22 outputs the state of the basic program or the application program which changes according to the input event information, to the operation screen generator 21 as image information or voice information.

As a result, an image that would be displayed on a display if the display were equipped with the main device B can be displayed on the terminal device T. Furthermore, a voice that would be output by a speaker if the speaker were equipped with the main device B can be output from the terminal device T.

The central processor 22 delivers the multicast packets and broadcast packets generated on the operation process and response packets to unicast packets received via the tunnel processor 26 to the tunnel processor 26, and delivers other packets to the wired transmission and reception unit 27.

In a packet transmitted via the tunnel processor 26, a source address of the inside IP header is Ab'. A destination address of the inside IP header is a communication destination address of the central processor 22. A source address of an outside IP header is Ab. A destination address of the outside IP header is At.

In a packet transmitted without being passed through the tunnel processor 26, a source address of the IP header is Ab, and a destination address of the IP header is a communication destination address of the central processor 22.

Furthermore, the central processor 22 causes the basic program or application program to operate according to a packet received from the external input processor 23 or the tunnel processor 26.

Figure 16:
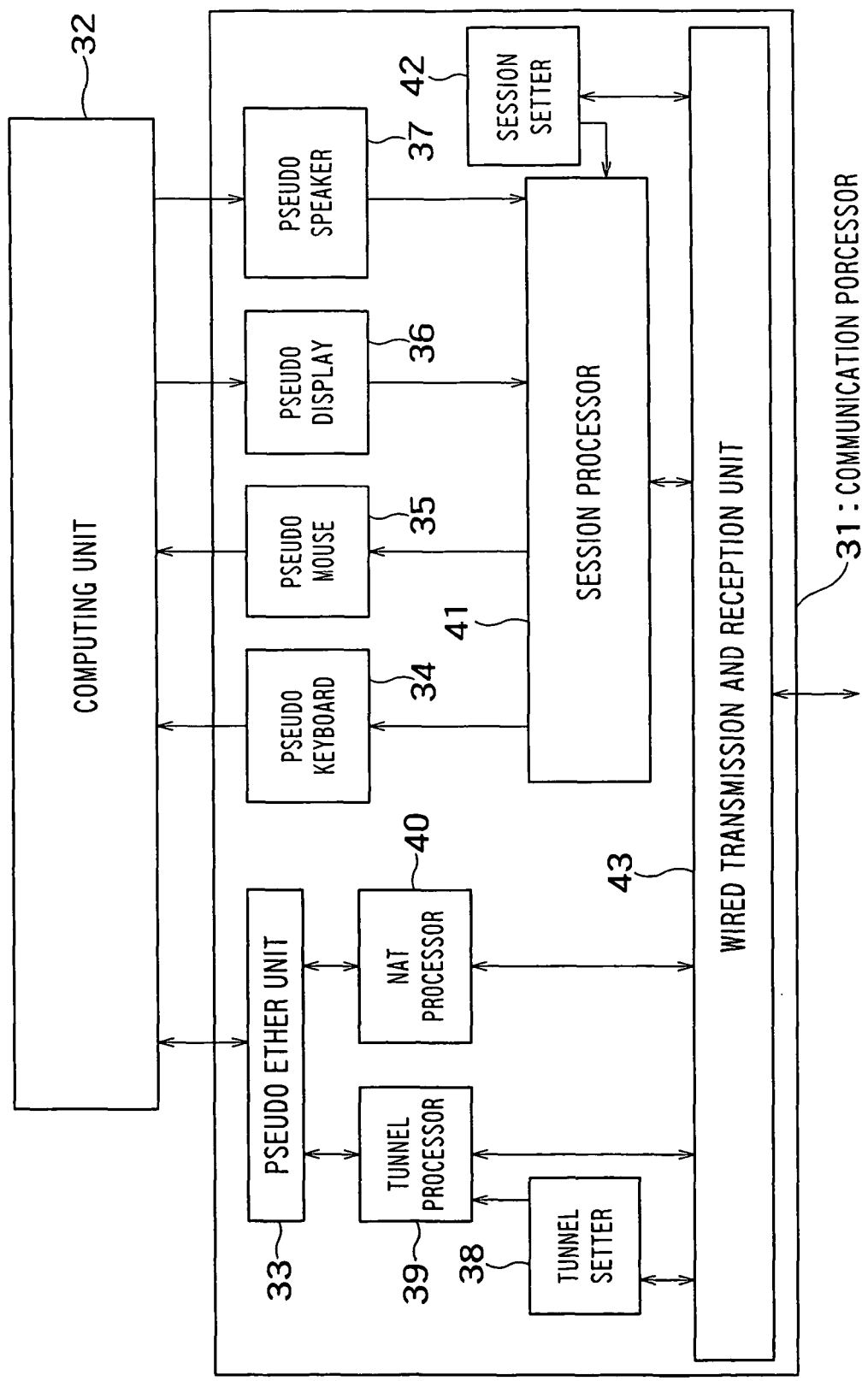
FIG. 16 shows another configuration example of the main device B.

Another configuration example of the main device B will now be described with reference to FIG. 16.

The main device roughly includes a communication processor 31 and a computing unit 32. The computing unit 32 is, for example, a personal computer. The communication processor 31 is, for example, a box attached to the outside of the computing unit 32. The communication processor 31 has a function of making it seem to the computing unit 32 that the computing unit 32 belongs to the same subnetwork as the terminal T does.

The computing unit 32 includes a CPU, a memory, an OS, and application programs. The computing unit 32 further includes a communication interface, a keyboard interface, a mouse interface, a display interface, and a speaker interface.

The communication interface, the keyboard interface, the mouse interface, the display interface, and the speaker interface are connected to the communication processor 31.

The communication interface acquires an IP address according to the DHCP via the communication processor 31 and the terminal device T, and conducts communication with another device via the communication processor 31 by using this IP address.

The communication processor 31 includes a pseudo Ether unit 33, a pseudo keyboard 34, a pseudo mouse 35, a pseudo display 36, a pseudo speaker 37, a tunnel setter 38, a tunnel processor 39, a NAT processor 40, a session processor 41, a session setter 42, and a wired transmission and reception unit 43.

The wired transmission and reception unit 43 conducts packet transmission and reception processing.

Upon receiving a packet from the outside, the wired transmission and reception unit 43 conducts inspection on the packet.

If a protocol number in its IP header indicates the UDP and its UDP destination port indicates a previously given number for session setting, the wired transmission and reception unit 43 delivers the packet to the session setter 42.

If the protocol number in its IP header indicates the UDP and its UDP destination port indicates a session port number given by the session setter 42, the wired transmission and reception unit 43 delivers the packet to the session processor 41.

If the protocol number in its IP header indicates the UDP and its UDP destination port indicates a previously determined number for tunnel setting, the wired transmission and reception unit 43 delivers the packet to the tunnel setter 38.

If the protocol number in its IP header indicates the UDP and its UDP destination port indicates a number given by the tunnel setter 38, the wired transmission and reception unit 43 delivers the packet to the tunnel processor 39.

The wired transmission and reception unit 43 delivers other packets to the NAT processor 40.

Upon receiving a session connection request via the wired transmission and reception unit 43, the session setter 42 transmits an authentication request toward the terminal device T via the wired transmission and reception unit 43. The authentication request contains a previously set IP address of the own node, a previously set authentication algorithm identifier, and a previously set challenge parameter.

Upon receiving an authentication response via the wired transmission and reception unit 43, the session setter 42 calculates an authentication response value by using an algorithm indicated by the authentication algorithm identifier on the basis of the challenge parameter contained in the authentication response and a previously set password. The session setter 42 determines whether the calculated authentication response value coincides with an authentication response value contained in the authentication response.

In the case of noncoincidence, the session setter 42 generates a session connection rejection (FIG. 8) having a description of a user identifier contained in the authentication response, and transmits the session connection rejection to the terminal device T via the wired transmission and reception unit 43.

If the two authentication response values coincide with each other, the session setter 42 generates a session connection response and transmits the session connection response to the terminal device T via the wired transmission and reception unit 43. The session connection response contains a previously set IP address of the own node, a previously set port number (session port number) of the own node, and communication parameters that are common to a plurality of previously set communication parameters and communication parameters contained in the session connection request.

Upon receiving a session connection acknowledgement via the wired transmission and reception unit 43, the session setter 42 delivers communication parameters, an IP address of the terminal device T and a session port number contained in the session connection acknowledgement to the session processor 41.

Furthermore, the session setter 42 delivers the previously set port number (session port number) of the own node to the wired transmission and reception unit 43.

Upon receiving input event information from the terminal device T via the wired transmission and reception unit 43, the session processor 41 decodes the input event information, delivers input information supplied from the mouse of the terminal device T to the pseudo mouse processor 35, and delivers input information supplied from the keyboard of the terminal device T to the pseudo keyboard processor 34.

Upon receiving image information from the pseudo display processor 36 or voice information from the pseudo speaker processor 37, the session processor 41 encodes the image information or the voice information in accordance with the communication parameters received from the session setter 42, and transmits the encoded image information or the voice information toward the IP address and port number received from the session setter 42 via the wired transmission and reception unit 43.

Upon receiving a keyboard input from the session processor 41, the pseudo keyboard 34 converts the keyboard input to a signal of the keyboard interface in the computing unit 32, and delivers the signal to the computing unit 32.

Upon receiving a mouse input from the session processor 41, the pseudo mouse 35 converts the mouse input to a signal of the mouse interface in the computing unit 32, and delivers the signal to the computing unit 32.

If a image signal is input from the display interface in the computing unit 32, the pseudo display 36 converts the image signal to an internal form, and outputs a resultant signal to the session processor 41 as image information.

If a voice signal is input from the speaker interface in the computing unit 32, the pseudo speaker 37 converts the voice signal to an internal form, and outputs a resultant signal to the session processor 41 as voice information.

Since the tunnel setter 38 is the same as the tunnel setter 25 described with reference to FIG. 15, detailed description of the tunnel setter 38 will be omitted.

In brief, the pseudo Ether unit 33 has a function of returning a response packet to a packet brought through the tunnel processor 39, via the tunnel processor 39, and returning a response packet to a packet brought through the NAT processor 40, via the NAT processor 40. Hereafter, details of the function will be described.

The pseudo Ether unit 33 converts a packet received from the tunnel processor 39 or the NAT processor 40 to a signal of the Ether interface in the computing unit 32, and delivers the resultant signal to the computing unit 32.

Upon receiving a packet signal from the Ether interface in the computing unit 32, the pseudo Ether unit 33 converts the packet signal to an internal form. If a flow to which the packet is belonging is stored, the pseudo Ether unit 33 delivers the resultant signal to the tunnel processor 39. Otherwise, the pseudo Ether unit 33 delivers the resultant signal to the NAT processor 40.

If a packet is input from the tunnel processor 39 and its destination address is a unicast address, the pseudo Ether unit 33 retains an entry having (destination address, source address, protocol number, destination port number, and source port number). Thereby, storage of a flow is conducted. Here, the destination address, source address and protocol number are described in fields in the IP header. The destination port number and source port number are described in the UDP or TCP header. The pseudo Ether unit 33 can store as many different entries as a predetermined number.

Upon receiving a packet signal from the computing unit 32, the pseudo Ether unit 33 determines whether (source address, destination address, protocol number, source port number, and destination port number) of the packet coincide with (destination address, source address, protocol number, destination port number, and source port number) of the stored flow. In the case of coincidence, the pseudo Ether unit 33 judges the packet to belong to the flow.

If the pseudo Ether unit 33 has not received a packet belonging to the flow from the computing unit 32 for a predetermined time and the pseudo Ether unit 33 has not received a packet having the same (destination address, source address, protocol number, destination port number, and source port number) as the flow does, from the tunnel processor 39 for a predetermined time, the stored entry is erased.

Here, (destination address, source address, protocol number, destination port number, and source port number) have been used as an example of the flow discrimination. If the protocol number does not indicate the UDP or TCP, however, processing can be conducted by setting the destination port number to 0 and the source port number to 0. In the case of IPv6, it is also possible to discriminate the flow by using a flow label in its IP header.

Upon receiving a packet capsulated according to the L2TP from the wired transmission and reception unit 43, the tunnel processor 39 removes the Ether header, IP header, UDP header, and L2TP header from the head of the packet, and delivers the remaining Ether header, IP header and data to the pseudo Ether unit 33.

Furthermore, upon receiving an Ether packet from the pseudo Ether unit 33, the tunnel processor 39 adds an Ether header, an IP header, a UDP header and an L2TP header to the Ether packet. The tunnel processor 39 transmits a resultant Ether packet to the wired transmission and reception unit 43. At this time, an Ether address of the own node is described in a source address of the Ether header, and an Ether address of a router (not illustrated) is described in a destination address of the Ether header.

Furthermore, the tunnel processor 39 describes the address of the opposite party received from the tunnel setter 38 in a destination address of the IP header, and described the own address received from the tunnel setter 38 in a source address of the IP header.

Furthermore, the tunnel processor 39 describes the port number of the opposite party received from the tunnel setter 38 in a destination port of the UDP header, and describes the own port number received from the tunnel setter 38 in a source port of the UDP header.

Furthermore, the tunnel processor 39 describes the session ID received from the tunnel setter 38 in a session ID of the L2TP header.

Upon receiving a packet from the pseudo Ether unit 33, the NAT processor 40 replaces a source address of the Ether header with an Ether address of the own node, replaces a source address of the IP header with an IP address of the own node, and transmits the resultant packet to the wired transmission and reception unit 43.

Upon receiving a packet from the wired processor 43, the NAT processor 40 replaces the destination address of the Ether header with an Ether address of the computing unit 32, replaces a destination address of the IP header with an IP address of the computing unit 32, and delivers the resultant packet to the pseudo Ether unit 33.

As heretofore described, the main device B includes the communication processor 31 and the computing unit 32. Therefore, the computer function 32 may not have a function of finding service in the neighborhood of the terminal device T. In other words, the communication processor 31 delivers a packet for finding service in the neighborhood of the terminal device T to the computing unit 32 by setting a tunnel. As a result, the computing unit 32 can find service in the neighborhood of the terminal device T.

Furthermore, the computing unit 32 can use service found via the communication processor 31.

Furthermore, the computing unit 32 can transmit a screen display image and a speaker output to the terminal device T and receive mouse operation and keyboard operation from the terminal device T via the communication processor 31.

As a result, an ordinary personal computer can be used as the computing unit 32. The price of the main device B can be lowered by thus using a general-purpose computer. Even if the data processing capability of the main device B becomes insufficient, it is sufficient to replace only the computing unit 32. Therefore, the cost for updating the data processing capability can be reduced.

Heretofore, the case where the main device B physically includes the two units, i.e., the computing unit 32 and the communication processor 31 has been described. Instead, the present invention can also be applied to the case where the main device B is one apparatus in hardware and the computing unit 32 and the communication processor 31 are separated from each other in software. For example, it is also possible to implement the communication processor 31 by using a host OS that directly controls hardware while using software that implements a virtual PC such as VMWARE, and regard a guest OS that operates on the virtual PC implemented on the host OS as the computing unit 32.

In this case, it becomes possible to implement a plurality of computing units 32 by using one piece of hardware.

Figure 17:
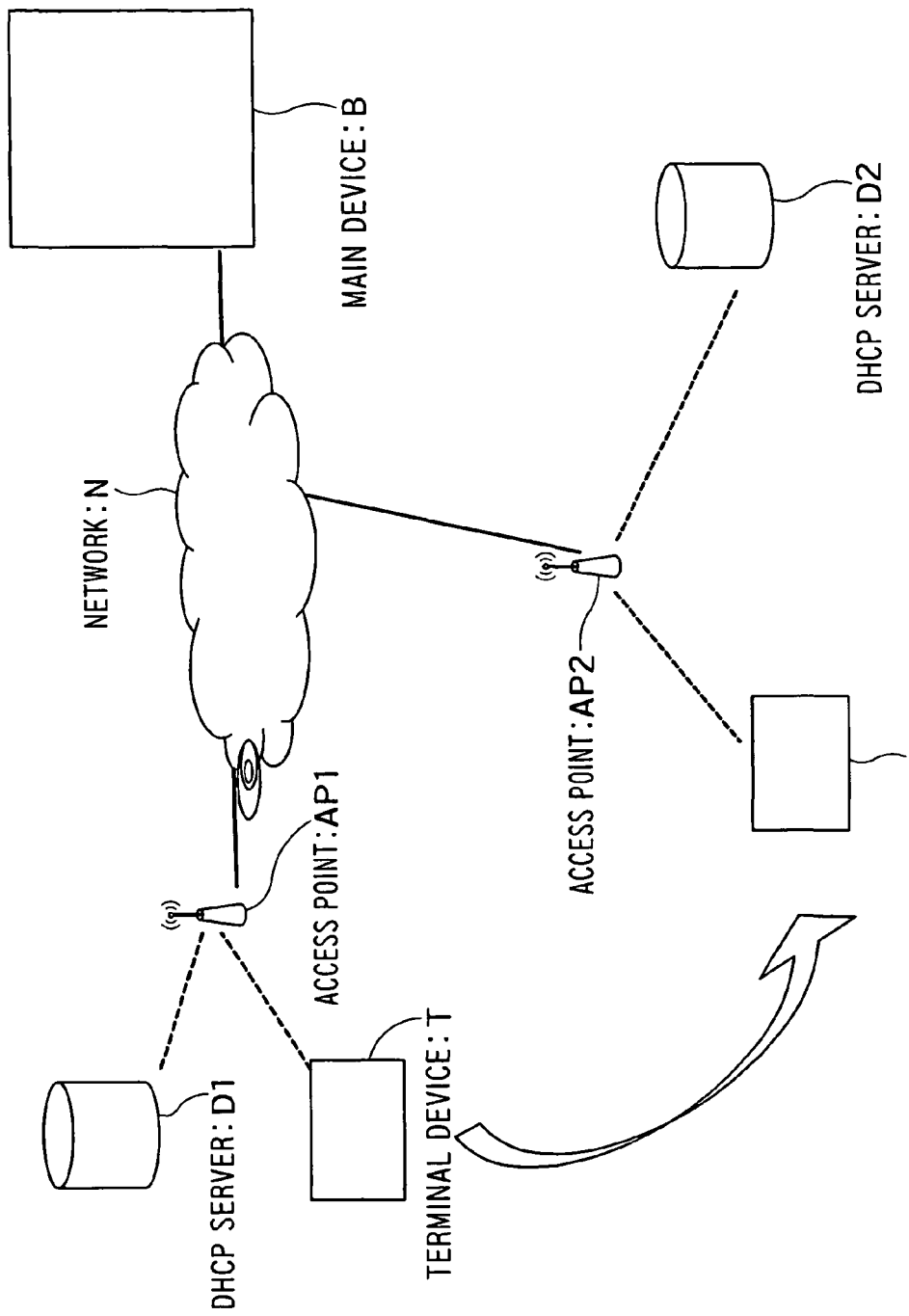
FIG. 17 is a diagram showing the case where the terminal device T has moved from an access point AP1 to an access point AP2.

Here, if the terminal device T has moved from an access point AP1 to an access point AP2 as shown in FIG. 17, the terminal device T transmits a DHCP RENEW packet having an address acquired from a DHCP server D1, at the time of re-connection of a wireless link with AP 2 after the movement. An answer to this is not obtained for a predetermined time. As a result, the terminal device T starts the operation for re-acquiring the address.

By the operation, the terminal device T can acquire an address from a DHCP server D2.

After the address re-acquisition, the terminal device T establishes a session and a tunnel between the main device B and the terminal device T.

In the embodiments of the present invention heretofore described, the terminal device T conducts packet transmission and reception via a wireless link. Even if the terminal device T conducts packet transmission and reception via a wired link, the effects of the present invention are not diminished.

The L2TP is used as an example of the tunnel. Even if a different tunnel technique, such as PPTP (Point-to-Point Tunneling Protocol) or MPLS (Multi-Protocol Label Switching), is used instead of the L2TP, however, the effects of the present invention are not diminished.

The DHCP is used as an example of means by which the main device B or the terminal device T acquires the address Ab' or At. Even if other means such as a method of previously conducting manual setting are used instead of the DHCP, the effects of the present invention are not diminished.

In the case where the IPv6 is used, it is also possible to use the automatic address setting function instead of the DHCP. In this case, the main device B transmits an RS (Router Solicitation) message to the network having the terminal device, via the tunnel, and receives an RA (Router Advertisement) message from a router (not illustrated) via the tunnel. As a result, the main device B acquires an IPv6 address. Or in the case IPv6, the main device B can also use a link local address.

An example in which the main device B or the terminal device T uses a different address has been described. Alternatively, the same address can also be used. In this case, the address of the terminal device T is contained in the session connection acknowledgement, and a notice of a resultant session connection acknowledgement is sent to the main device B. The terminal device T transmits packets other than operation screen data supplied from the main device B, packets received from the tunnel, and a response packet to an ARP request transmitted by itself, to the main device B via the tunnel.

If power supplied to the terminal device is turned off, the main device can detect it by using, for example, the control function of the L2TP.

Even if the power turn-off of the terminal device is detected when the main device is conducting communication with, for example, the computer C without using the tunnel, the main device may continue the communication with the computer C. Communication with the computer C without being passed through the tunnel may be stopped a definite time after the power turn-off. Or if the address of the terminal device contained in a session connection request received from the terminal device is different from that contained in a session connection request received last time, communication with the computer C without being passed through the tunnel may be stopped.

According to the embodiments of the present invention, the main device can transmit/receive broadcast packets or multicast packets to/from a communication apparatus located in the neighborhood of the terminal device as heretofore described. As a result, it becomes possible for the main device to find a device or service in the neighborhood of the terminal device. Furthermore, since communication started by the main device is conducted without being passed through the terminal device, it is possible to prevent extra processing load from being imposed on the terminal device. In addition, the main device transmits a packet that is a response to a packet received without being pass through the tunnel, without passing it through the tunnel. Therefore, it becomes possible to hold down the processing load required to transfer packets to the terminal device to a low value.

The invention claimed is:

1. An information processing server that communicates with a terminal device connected to a first network, the information processing server being connected to a second network different from the first network, comprising:
a tunnel setter configured to set a tunnel with the terminal device based on an IP address of the information processing server and an IP address of the terminal device, wherein the tunnel virtually connects the information processing server to the first network via the terminal device, and wherein the terminal device encapsulates a packet and transmits the encapsulated packet to the information processing server so as to transmit the packet to the information processing server by using the tunnel, and receives a packet from the information processing server and decapsulates the packet so as to receive the packet from the information processing server by using the tunnel;
a reception unit configured to receive a broadcast or multicast packet output from one or more service providing servers on the first network, via the terminal device by using the tunnel;
a server finding unit configured to find service providing servers on the first network and services provided by the service providing servers, based on the received broadcasts or multicast packets;
a notification unit configured to notify the services found in the server finding unit, to the terminal device by using the tunnel; and
a data communication unit configured to receive an execution request of the service transmitted from the terminal device without using the tunnel, wherein the terminal device transmits the execution request when the terminal device receives an execution request of the service through a user input, and transmits a packet to request data communication concerning the service to the service providing server related to the service not via the terminal device, wherein the packet has the IP address of the information processing server as a transmission source address, and conduct the data communication concerning the service with the service providing server not via the terminal device.

2. The information processing server according to claim 1, wherein the data communication unit transmits a result of the data communication without using the tunnel to the terminal device.

3. The information processing server according to claim 1, wherein the notification unit notifies the terminal device of identifiers of the service providing servers found by the server finding unit by using the tunnel,
upon receiving an execution request of the service provided by the service providing server having the identifier, the data communication unit conducts data communication concerning the service with the service providing server having the identifier not via the terminal device.

4. The information processing server according to claim 3, wherein
the service finding unit finds a contents providing server as the service providing server,
the notification unit notifies the terminal device of identifiers of contents provided by the contents providing server by using the tunnel, and
upon being requested to provide contents having the identifier from the terminal device as the execution request of the service without using the tunnel, the data communication unit acquires the contents having the identifier from the contents providing server not via the terminal device and transmits the acquired contents to the terminal device without using the tunnel.

5. The information processing server according to claim 4, wherein the data communication unit acquires still picture data, video data, voice data or document data as the contents.

6. The information processing server according to claim 1, wherein
the service finding unit finds an image output apparatus as the service providing server; and
the data communication unit receives data transmitted from the terminal device without using the tunnel and transmits the data to the image output apparatus not via the terminal device.

7. The information processing server according to claim 6, wherein the image output apparatus is a printer.

8. The information processing server according to claim 1, wherein the server finding unit transmits a broadcast or multicast packet for finding service providing servers on the first network by using the tunnel to cause the terminal device to send the broadcast or multicast packet onto the first network, receives response packets to the transmitted broadcast or multicast packet by using the tunnel from the terminal, and finds the service providing servers on the first network and services provided by the service providing servers, on the basis of the received response packets.

9. The information processing server according to claim 8, further comprising an IP address acquisition unit configured to acquire an IP address of the first network, wherein
a DHCP (Dynamic Host Configuration Protocol) server is connected to the first network,
the IP address acquisition unit acquires the IP address of the first network by communicating with the DHCP server by using the tunnel via the terminal device, and
the server finding unit uses the acquired IP address as an address of a transmission source of the broadcast or multicast packet to be transmitted to the terminal device by using the tunnel.

10. The information processing server according to claim 1, wherein the tunnel setter sets the tunnel by using L2TP (Layer 2 Tunneling Protocol), PPTP (Point-to-Point Tunneling Protocol) or MPLS (Multi-Protocol Label Switching).

11. A remote control system including a terminal device connected to a first network and an information processing server connected to a second network, wherein the terminal device comprises:
a first tunnel setter configured to set a tunnel with the information processing server based on an IP address of the information processing server and an IP address of the terminal device, wherein the tunnel virtually connects the information processing server to the first network via the terminal device and wherein the terminal device encapsulates a packet and transmits the encapsulated packet to the information processing server so as to transmit the packet to the information processing server by using the tunnel, and receives a packet from the information processing server and decapsulates the packet so as to receive the packet from the information processing server by using the tunnel; and a transfer unit configured to receive a broadcast or multicast packet output from one or more service providing servers on the first network and transmits the received broadcast or multicast packets to the information processing server by using the tunnel, and the information processing server comprises:

a second tunnel setter configured to set the tunnel with the terminal device based on an IP address of the information processing server and an IP address of the terminal device;

a reception unit configured to receive the broadcast or multicast packets from the terminal device by using the tunnel;

a server finding unit configured to find service providing servers on the first network and services provided by the service providing servers, based on the received broadcast or multicast packets;

a notification unit configured to notify the services found in the server finding unit to the terminal device by using the tunnel; and a data communication unit configured to receive an execution request of the service from the terminal device without using the tunnel and upon receiving of the execution request, to transmit a packet to request data communication concerning the service to the service providing server related to the service not via the terminal device, wherein the packet has the IP address of the information processing server as a transmission source address, and conduct the data communication concerning the service with the service providing server not via the terminal device, wherein the terminal device transmits the execution request without using the tunnel to the information processing server when the terminal device receives an execution request of the service through a user input.

12. The remote control system according to claim 11, wherein the data communication unit transmits a result of the data communication to the terminal device not via the terminal device.

13. The remote control system according to claim 11, wherein the notification unit notifies the terminal device of identifiers of the service providing servers found by the server finding unit by using the tunnel, and upon receiving an execution request of the service provided by the service providing server having the identifier, the data communication unit conducts data communication concerning the service with the service providing server having the identifier not via the terminal device.

14. The remote control system according to claim 11, wherein the server finding unit in the information processing server transmits a broadcast or multicast packet for finding service providing servers on the first network to the terminal device by using the tunnel, the transfer unit in the terminal device receives the broadcast or multicast packet from the server finding unit in the server finding unit by using the tunnel, outputs the broadcast or multicast packet onto the first network, receives response packets to the output broadcast or multicast packet, and transmits the received response packets to the server finding unit by using the tunnel, and the server finding unit finds service providing servers on the first network and service provided by the service providing servers, on the basis of the response packets received from the transfer unit in the terminal device.

15. The remote control system according to claim 14, wherein a DHCP (Dynamic Host Configuration Protocol) server is connected to the first network, the information processing server further comprises an IP address acquisition unit configured to acquire an IP address of the first network by communicating with the DHCP server by using the tunnel, and the server finding unit uses the IP address acquired by the IP address acquisition unit as an address of a transmission source of the broadcast or multicast packet to be transmitted to the terminal device by using the tunnel.

16. The remote control system according to claim 11, wherein the first and second tunnel setters set the tunnel by using L2TP (Layer 2 Tunneling Protocol), PPTP (Point-to-Point Tunneling Protocol), or MPLS (Multi-Protocol Label Switching).

17. A remote control method using a terminal device connected to a first network and an information processing server connected to a second network, comprising:

setting a tunnel between the terminal device and the information processing server based on an IP address of the information processing server and an IP address of the terminal device, wherein the tunnel virtually connects the information processing server to the first network via the terminal device, and wherein the terminal device encapsulates a packet and transmits the encapsulated packet to the information processing server so as to transmit the packet to the information processing server by using the tunnel, and receives a packet from the information processing server and decapsulates the packet so as to receive the packet from the information processing server by using the tunnel;

transmitting a broadcast or multicast packet output from one or more service providing servers on the first network to the information processing server by using the tunnel from the terminal device to the information processing server to cause the information processing server to find the service providing servers and services provided by the service providing servers;

notifying the services found to the terminal device from the information processing server by using the tunnel;

transmitting by the terminal device an execution request of the service to the information processing server without using the tunnel when the terminal device receives an execution request of the service through a user input; and when the execution request is received by the information processing server, transmitting by the information processing server a packet to request data communication concerning the service to the service providing server not via the terminal device, wherein the packet has the IP address of the information processing server as a transmission source address, and conducting the data communication concerning the service between the service providing server and the information processing server not via the terminal device.

18. The remote control method according to claim 17, further comprising transmitting a result of the data communication from the information processing server to the terminal device not via the terminal device.

19. The remote control method according to claim 17, further comprising;
- notifying the terminal device of identifiers of the service providing servers by using the tunnel from the information processing server, and
- if the execution request of the service provided by the service providing server having the identifier is received by the information processing server, conducting data communication concerning the service between the service providing server having the identifier and the information processing server not via the terminal device.

* * * * *